United States Patent
Kouma et al.

(10) Patent No.: US 7,453,182 B2
(45) Date of Patent: Nov. 18, 2008

(54) MICRO OSCILLATING ELEMENT

(75) Inventors: Norinao Kouma, Kawasaki (JP);
Osamu Tsuboi, Kawasaki (JP);
Hiromitsu Soneda, Kawasaki (JP);
Satoshi Ueda, Kawasaki (JP); Ippei Sawaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 11/290,489

(22) Filed: Dec. 1, 2005

(65) Prior Publication Data

US 2006/0120425 A1    Jun. 8, 2006

(30) Foreign Application Priority Data

Dec. 2, 2004    (JP)    .............................. 2004-350337

(51) Int. Cl.
*H02N 1/00*    (2006.01)
*G02B 26/08*    (2006.01)

(52) U.S. Cl. ...................................... 310/309; 359/225

(58) Field of Classification Search ................. 359/255, 359/874, 876; 310/309
See application file for complete search history.

(56) References Cited

U.S. PATENT DOCUMENTS 5,740,150 A    4/1998 Uchimaru et al.    ........... 369/119
6,287,885 B1    9/2001 Muto et al.    ................... 438/48
6,870,300 B2 *    3/2005 Bolle et al.    ................. 310/309

FOREIGN PATENT DOCUMENTS

| JP | 9-146032 | 6/1997 |
| JP | 9-146034 | 6/1997 |
| JP | 10-190007 | 7/1998 |
| JP | 2000-31502 | 1/2000 |

* cited by examiner

*Primary Examiner*—Burton Mullins
(74) *Attorney, Agent, or Firm*—Kratz, Quintos & Hanson, LLP.

(57) ABSTRACT

A micro oscillating element is formed integrally from a material substrate made up of a first conductive layer, a second conductive layer and an insulating layer disposed between the first conductive layer and the second conductive layer. This oscillating element includes an oscillation section, an oscillation section supporting frame, and a torsional joining section. The oscillation section includes a movable functional section. The torsional joining section joins the oscillation section and the frame, and also defines an oscillation axis for oscillating action of the oscillation section. The movable functional section is a part formed in the first conductive layer, while the frame is a part formed in the second conductive layer.

19 Claims, 40 Drawing Sheets

MICRO OSCILLATING ELEMENT

BACKGROUND OF THE INVENTION

1. Field of the Invention

The present invention relates to a micro oscillating element comprising an oscillation section capable of rotary displacement. The micro oscillating element of the present invention is applicable for producing a micromirror, an acceleration sensor, an angular speed sensor, and a vibrator, for example.

2. Description of the Related Art

In recent years, elements having a very fine structure formed by micromachining technology have found application in a variety of technological field. For example, very small micromirror elements having light reflection function have attracted attention in the field of optical communications technology.

In optical communications, optical signals are transmitted via optical fibers as a medium, and optical switching devices are generally used for switching the transmission path of optical signals from one fiber to another. A large capacity, high speed, and high reliability in switching operation are the characteristics required for the optical switching devices to realize good optical communication. From those standpoints, high hopes are pinned on the assemblies comprising micromirror elements as the optical switching devices fabricated by micromachining technology. This is because the micromirror elements can conduct switching of optical signals directly, that is, without converting the optical signals into electric signals, between the input optical transmission path and output optical transmission path in the optical switching device and are advantageous in terms of obtaining the above-described characteristics.

A micromirror element can comprise a mirror surface for reflecting the light, and the reflection direction of the light can be changed by the oscillation of the mirror surface. Micromirror elements of an electrostatic drive type that use an electrostatic pull-in force for turning the mirror surface have been used in a large number of devices. The micromirror elements of an electrostatic drive type can be generally classified into two groups: micromirror elements fabricated by the so-called surface micromachining technology and micromirror elements fabricated by the so-called bulk micromachining technology.

With the surface micromachining technology, various parts constituting the element, such as a supporting and fixing sections, oscillation section, mirror surface, and electrode sections, or a sacrificial layer that is subsequently removed are formed in a substrate by machining thin material films corresponding to each structural part to the desired pattern and then successively laminating the patterns. On the other hand, with the bulk micromachining technology, the fixing and supporting section or oscillation section are formed to the described shape by etching the material substrate itself and then the mirror surface or electrodes are formed as thin films. The bulk micromachining technology is described, for example, in Japanese Patent Applications Laid-open Nos. H09-146032, H09-146034, H10-190007, and 2000-31502.

A high flatness of the mirror surface serving to reflect the light is one of the technological characteristics required from the micromirror element. However, with the surface micromachining technology, the mirror surface that is finally formed is thin and the mirror surface can be easily bent. Therefore, a high degree of flatness is difficult to attain on the mirror surface of a large area. By contrast, with the bulk micromachining technology, a material substrate of a comparatively large thickness is cut by etching to form a mirror supporting section and a mirror surface is provided on the mirror supporting section. Therefore, even if the mirror surface has a large area, the rigidity thereof can be ensured. As a result, a mirror surface of a sufficiently high degree of optical flatness can be formed.

FIGS. 40-43 illustrate an example of a micromirror element (generally indicated by X4), as related art, which can be manufactured by a conventional method. FIG. 40 is a plan view of the micromirror element X4. FIGS. 41-43 are the cross-sectional views along the lines XXXXI-XXXXI, XXXXII-XXXXII, and XXXXIII-XXXXIII in FIG. 40, respectively.

The micromirror element X4 comprises an oscillation section 80, a frame 91, a pair of oscillating bars 92, and a comb-tooth electrode 93 and is manufactured by conducting the below-described machining of a material substrate that is the so-called SOI (silicon on insulator) substrate by a bulk micromachining technology. As described below, the material substrate has a laminated structure composed of silicon layers 201, 202 and an insulating layer 203 located therebetween. The silicon layers 201, 202 are provided with the prescribed electric conductivity by doping with dopants. The aforementioned various parts of the micromirror element X4 are formed from the silicon layer 201 and/or silicon layer 202. In order to make the figure clearer, in FIG. 40, the parts derived from the silicon layer 201 and protruding forward from the paper sheet with respect to the insulating layer 203 are provided with hatching.

The oscillation section 80, for example, as shown in FIG. 43, is a part derived from the silicon layer 201. It has a mirror support section 81, a comb-tooth electrode 82, and a beam section 83. A mirror surface 81a having a light reflection function is provided on the surface of the mirror support section 81. The comb-tooth electrode 82 is composed of a base section 82a and a plurality of electrode teeth 82b extending from the base section. The beam section 83 joins the mirror support section 81 and comb-tooth electrodes 82 and is electrically connected to these two sections.

The frame 91 is a part mainly derived from the silicon layers 201, 202, as shown in FIGS. 41-43. It has a shape surrounding the oscillation section 80 and supports the structure located inside the frame 91.

A pair of oscillating bars 92 are the parts derived from the silicon layer 201. They are connected to the beam section 83 of the oscillation section 80 and the parts derived from the silicon layer 201 in the frame 91 and join them. Each oscillating bar 92 electrically connects the beam section 92 and the parts derived from the silicon layer 201 in the frame 91. Such a pair of oscillating bars 92 defines an oscillation axis A4 for the oscillating action of the oscillation section 80 through mirror support section 81.

The comb-tooth electrode 93 is a part for generating an electrostatic pull-in force in cooperation with the comb-tooth electrode 82 and is composed of a plurality of electrode teeth 93a extending from the frame 91. The electrode teeth 93a are the parts derived from the silicon layer 202 and are fixed to the parts derived from the silicon layer 202 in the frame 91. Such comb-tooth electrode 93 and the above-described comb-tooth electrode 82 constitute a drive mechanism of the present element. For example, in a non-operative state of the oscillation section 80, the comb-tooth electrodes 82, 93 are positioned at different heights, as shown in FIG. 42 and FIG. 43. Furthermore, the electrode teeth 82b, 93a are arranged with a shift with respect to each other so that the comb-tooth electrodes 82, 93 are not in contact with each other during the oscillating action of the oscillation section 80.

In the micromirror element X4, the oscillation section 80 through mirror support section 81 can be caused to rotate around the oscillation axis A4, if necessary, by applying the prescribed electric potential to each comb-tooth electrode 82, 93. The application of electric potential to the comb-tooth electrode 82 can be realized via the parts derived from the first silicon layer of the frame 91, both oscillating bars 92, and beam section 83. The application of electric potential to the comb-tooth electrode 93 can be realized via the parts derived from the second silicon layer of the frame 91. If a desired electrostatic pull-in force is generated between the comb-tooth electrodes 82, 93 by applying the prescribed potential to the comb-tooth electrodes 82, 93, the comb-tooth electrode 82 is pulled in to the comb-tooth electrode 93. As a result, the oscillation section 80 through mirror support section 81 rotate around the oscillation axis A4 and the rotary displacement is induced till the angle is attained that provides for the balance between the electrostatic pull-in force between the comb-tooth electrodes 82, 93 and the sum of the twisting resistance forces of the oscillating bars 92. Further, if the electrostatic pull-in force acting between the comb-tooth electrodes 82, 93 is canceled, the oscillating bars 92 return to the natural state and the oscillation section 80 through the mirror support section 81 assume the orientation shown in FIG. 43. The above-described oscillating drive of the oscillation section 80 through mirror support section 81 makes it possible to switch appropriately the reflection direction of light reflected by the mirror surface 81a provided on the mirror support section 81.

FIG. 44 shows part of the process for the manufacture of the micromirror element X4. In FIG. 44, the process of forming part of the mirror support section 81, frame 91, oscillating bar 92, and part of the set of comb-tooth electrodes 82, 93 shown in FIG. 40 is represented as changes in one cross-section. This one cross-section is represented as a continuous cross-section obtained by simulating the cross-sections in a plurality of prescribed locations contained in a single micromirror element formation area in the material substrate (wafer having a multilayer structure) that is to be machined.

In the manufacture of the micromirror element X4, first, a material substrate 200 shown in FIG. 44A is prepared. The material substrate 200 is a SOI wafer and has a laminated structure composed of silicon layers 201, 202 and an insulating layer 203 located therebetween. Then, as shown in FIG. 44B, the mirror support section 81, parts of frame 91, oscillating bar 92, and comb-tooth electrode 82 are formed in the silicon layer 201 by conducting anisotropic etching of the silicon layer 201 via the prescribed mask. Then, as shown in FIG. 44C, part of the frame 91 and the comb-tooth electrode 93 are formed in the silicon layer 202 by conducting anisotropic etching of the silicon layer 202 via the prescribed mask. Then, as shown in FIG. 44D, zones exposed in the insulating layer 203 are removed by conducting anisotropic etching of the insulating layer 203. The oscillation section 80 (mirror support section 81, comb-tooth electrode 82, beam section 83), frame 91, oscillating bar 92, and comb-tooth electrode 93 are thus formed.

As described above, the oscillation section 80 is a part derived from the silicon layer 201, and the frame 91 has a part derived from the silicon layer 201 and a part derived from the silicon layer 202. For this reason, in the micromirror element X4, a gap has to be provided between the oscillation section 80, which is a movable section, and the frame 91, which is the fixed section, and those components have to be separated in the in-plane direction of the material substrate. The length of this gap between the oscillation section 80 and frame 91 has to be set above the prescribed level. For example, the length d4 between the oscillation section 80 and frame 91 of the gap G provided between the mirror support section 81 of the oscillation section 80 and the frame 91 has to be set above the prescribed level so that the material between the mirror support section 81 and frame 91 in the silicon layer 201 can be adequately etched out in the process described hereinabove with reference to FIG. 44B.

The smaller is the distance d4, the larger is the aspect ratio D/d4 (D is the thickness of the silicon layer 201) of the gap G that has to be formed between the mirror support section 81 and frame 91 in the process described hereinabove with reference to FIG. 44D. When the length d4 is less than the prescribed level and the aspect ratio D/d4 is larger than the prescribed level, the material between the mirror support section 81 and frame 91 is difficult to etch out adequately. As a result, the mirror support section 81, part of the frame 91, and gap G located therebetween are difficult to form adequately. Therefore, the length d4 of the gap G between the mirror support section 81 and frame 91 has to be increased to a degree ensuring a sufficiently small aspect ratio.

In such a micromirror element X4 in which the length d4 of the gap G between the mirror support section 81 and frame 91 has to be set above the prescribed level, miniaturization by reducing the size in the direction of the oscillation axis A4 and direction perpendicular thereto is sometimes difficult to attain.

SUMMARY OF THE INVENTION

The present invention has been proposed under the above-described circumstances. It is therefore an object of the present invention to provide a micro oscillating element that is suitable for miniaturization.

The micro oscillating element in accordance with the present invention is formed integrally from a material substrate made up of a first conductive layer, a second conductive layer and an insulating layer disposed between the first and the second conductive layers. The oscillating element comprises: an oscillation section including a movable functional section; an oscillation section supporting frame; and a torsional joining section for joining the oscillation section and the frame. The torsional joining section defines an oscillation axis for oscillating action of the oscillation section. The movable functional section is a part formed in the first conductive layer, while the frame is a part formed in the second conductive layer.

The micro oscillating element of such a configuration is manufactured, for example, by machining the material substrate having a laminated structure composed of a first conductive layer, a second conductive layer, and an insulating layer located between the first and second conductive layers by a bulk machining technology such as MEMS technology. The movable functional section is a part formed by conducting etching of the first conductive layer of the material substrate from the side opposite that of the insulating layer, and the frame is a part formed by conducting etching of the second conductive layer of the material substrate from the side opposite that of the insulating layer.

In the above-described micromirror element X4, a gap G having an aspect ratio D/d4 below the prescribed level (that is, the gap G having the length d4 above the prescribed level in the in-plane direction of the material substrate) has to be formed between the mirror support section 81 (movable functional section) and frame 91, thereby inhibiting the miniaturization of the element. By contrast, in the micro oscillating element in accordance with the present invention, the movable functional section and frame are the parts formed in different conductive layers. Therefore, when the movable functional section or frame is formed, it is not necessary to form the gap having an aspect ratio below the prescribed level (that is, the gap having the length above the prescribed level in the in-plane direction of the material substrate) between the movable functional section and frame. In the present micro oscillating element, the distance separating the movable functional section and frame in the in-plane direction of the material substrate may have a minimum length necessary to avoid the contact of the movable functional section with the frame during the oscillating action of the oscillation section. Therefore, the present micro oscillating element is adapted for miniaturization.

The present micro oscillating element may further comprise a thin structural section fixed to the frame via the insulating layer. This thin structural section is formed in the first conductive layer and made thinner than the first conductive layer. In this case, it is preferred that the thin structural section be electrically connected to the frame via a conductive connection section passing through the insulating layer. Alternatively, the present micro oscillating element may further comprise a narrow structural section that is narrower than said frame, formed in the first conductive layer, and fixed to the frame via the insulating layer. In this case, it is preferred that the narrow structural section be electrically connected to the frame via a conductive connection section passing through the insulating layer. Alternatively, the present micro oscillating element may further comprise a thin narrow structural section that is narrower than the frame, formed to be thinner than the movable functional section in the first conductive layer, and fixed to the frame via the insulating layer. In this case, it is preferred that the thin narrow structural section be electrically connected to the frame via a conductive connection section passing through the insulating layer. Those configurations are advantageous in terms of increasing the degree of freedom in selecting a wiring mode in the element, while miniaturizing the micro oscillating element.

In the preferred embodiment, the oscillation section further has an arm section and a first comb-tooth electrode. The arm section may extend from the movable functional section in a direction intersecting the extension direction of the oscillation axis. The first comb-tooth electrode may be made up of a plurality of first electrode teeth, each extending from the arm section in the direction intersecting the extension direction of the arm section, those first electrode teeth being separated from each other in the extension direction of the arm section. In this case, the micro oscillating element may further comprise a second comb-tooth electrode for generating a drive force of the oscillating action in cooperation with the first comb-tooth electrode. This second comb-tooth electrode may be composed of a plurality of second electrode teeth, each extending from the frame in a direction intersecting the extension direction of the arm section, those second electrode teeth being separated from each other in the extension direction of the arm section. The first and the second comb-tooth electrodes constitutive the so-called comb-tooth electrode actuator as a drive mechanism for the oscillating action of the oscillation section.

In the micro oscillating element having the above-described configuration, a plurality of the first electrode teeth of the first comb-tooth electrode are separated from each other in the extension direction of the arm section extending from the movable functional section and are supported by the arm section, and a plurality of the second electrode teeth of the second comb-tooth electrode are separated from each other in the extension direction of the arm section extending from the movable functional section and are supported by the frame. The first and second electrode teeth are not directly supported by the movable functional section. For this reason, the number of electrode teeth (first electrode teeth and second electrode teeth) constituting a set of comb-tooth electrodes (first comb-tooth electrode and second comb-tooth electrode) is not restricted by the length of the movable functional section in the extension direction of the oscillation axis that crosses, for example at a right angle, the extension direction of the arm section. Therefore, in the present invention, the desired surface area over which the electrode teeth can face each other in the first and second comb-tooth electrodes can be ensured by providing the desired number of the first and second electrode teeth, regardless of the designed dimensions of the movable functional section in the direction of the oscillation axis. In the present invention, in addition to ensuring the surface area over which the electrode teeth can face each other in the first and second comb-tooth, it is not necessary to reduce the width or increase the extension length of the first and second electrode teeth to the degree of degrading the mechanical strength of the first and second electrode teeth electrodes and it is not necessary to shorten the gap between the electrode teeth to the degree that is inconvenient from the standpoint of the element fabrication process. Thus, the present element is adapted for miniaturization by setting small design dimensions of the movable functional section in the direction of oscillation axis, that is, small design dimensions of the entire element, while ensuring the drive force of the oscillating action of the oscillation section by providing the desired number of the first and second electrode teeth, regardless of the design dimensions of the movable functional section in the direction of oscillation axis.

In the preferred embodiment, the extension direction of a plurality of first electrode teeth is parallel to the oscillation axis. In this case, the extension direction of the second electrode teeth is preferably parallel to the extension direction of the first electrode teeth. The configuration in which the extension directions of the first and second electrode teeth are parallel to the oscillation axis is advantageous because it can efficiently generate a drive force for the oscillating action around the oscillation axis.

In another preferred embodiment, the extension direction of a plurality of first electrode teeth and the extension direction of the oscillation axis intersect. In this case, the extension direction of the second electrode teeth is preferably parallel to the extension direction of the first electrode teeth. Even though the extension directions of the first and second electrode teeth are not parallel to the oscillation axis drive force for the oscillating action around the oscillation axis sometimes can be generated by the first and second comb-tooth electrodes.

Preferably the first comb-tooth electrode may be composed of three or more electrode teeth and the distance between two adjoining first electrode teeth increases with the distance from the oscillation axis. Furthermore, preferably the second comb-tooth electrode may be composed of three or more electrode teeth and the distance between two adjoining first electrode teeth increases with the distance from the oscillation axis. In the first electrode teeth, the displacement quantity in the electrode teeth separation direction (extension direction of the arm section) during oscillating action of the oscillation section increases with the distance from the oscillation axis, and those configurations are advantageous in terms of avoiding the abutment of the first electrode teeth against the second electrode teeth during oscillating action of the oscillation section.

Preferably a first electrode teeth positioned between two second electrode teeth adjacent in the extension direction of the arm section may be offset from the central position between the two second electrode teeth toward the oscillation axis. Alternatively, a first electrode teeth positioned between two second electrode teeth adjacent in the extension direction of the arm section may be shifted from the central position between the two second electrode teeth away from the oscillation axis. The employment of such configurations is sometimes advantageous in terms of inhibiting the so-called pull-in effect.

Preferably the micro oscillating element may further comprise an additional frame and an additional torsional joining section for joining the additional frame and the oscillation section supporting frame. The additional torsional joining section may also define an oscillation axis for the oscillating action of the oscillation section supporting frame. In this case, the extension direction of the oscillation axis is preferably perpendicular to the extension direction of the additional oscillation axis. The present element may thus be composed as a double-axis oscillating element.

DESCRIPTION OF THE PREFERRED EMBODIMENTS

Figure 1:
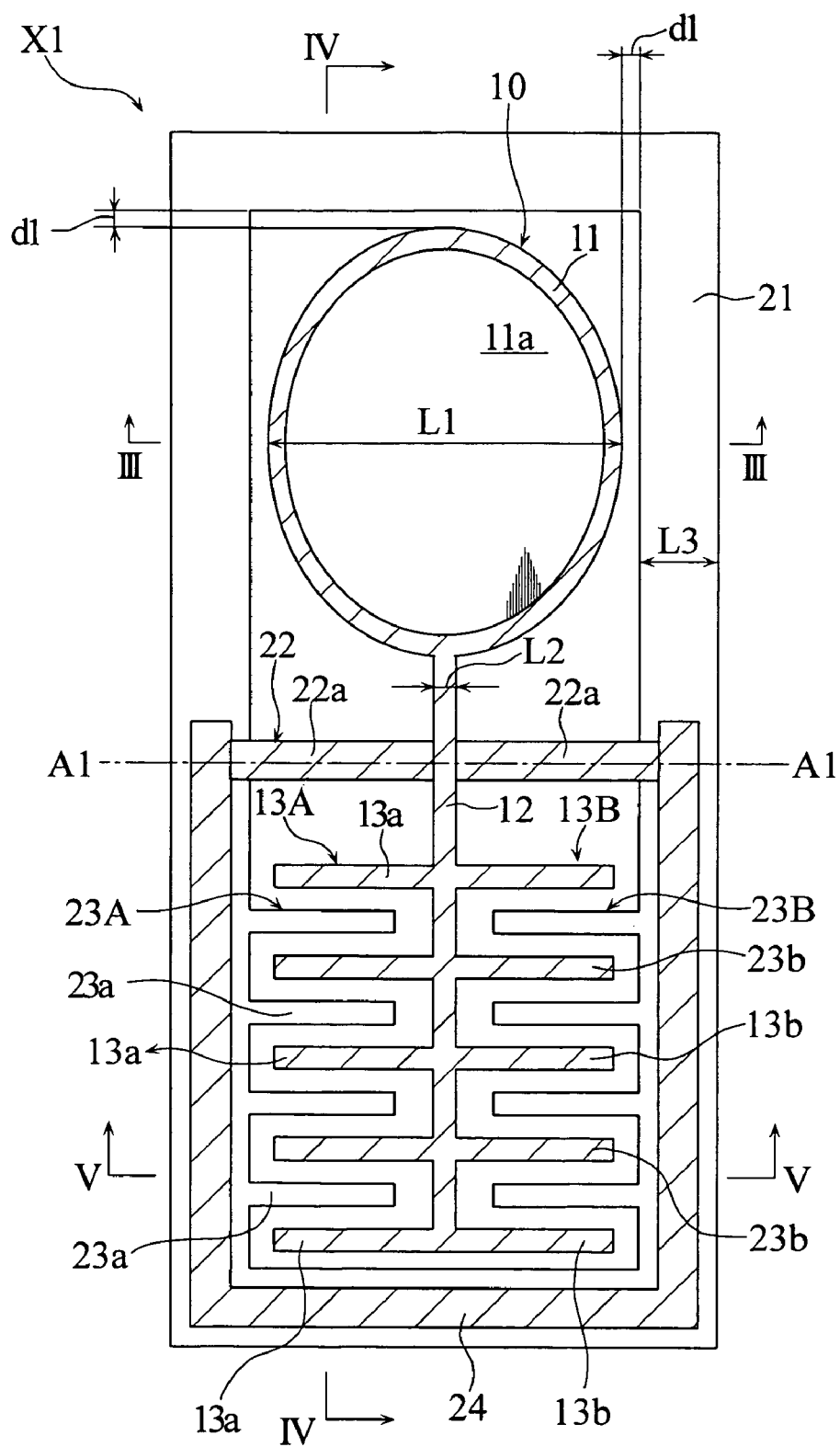
FIG. 1 is a plan view showing a micromirror element according to a first embodiment of the present invention.
Figure 2:
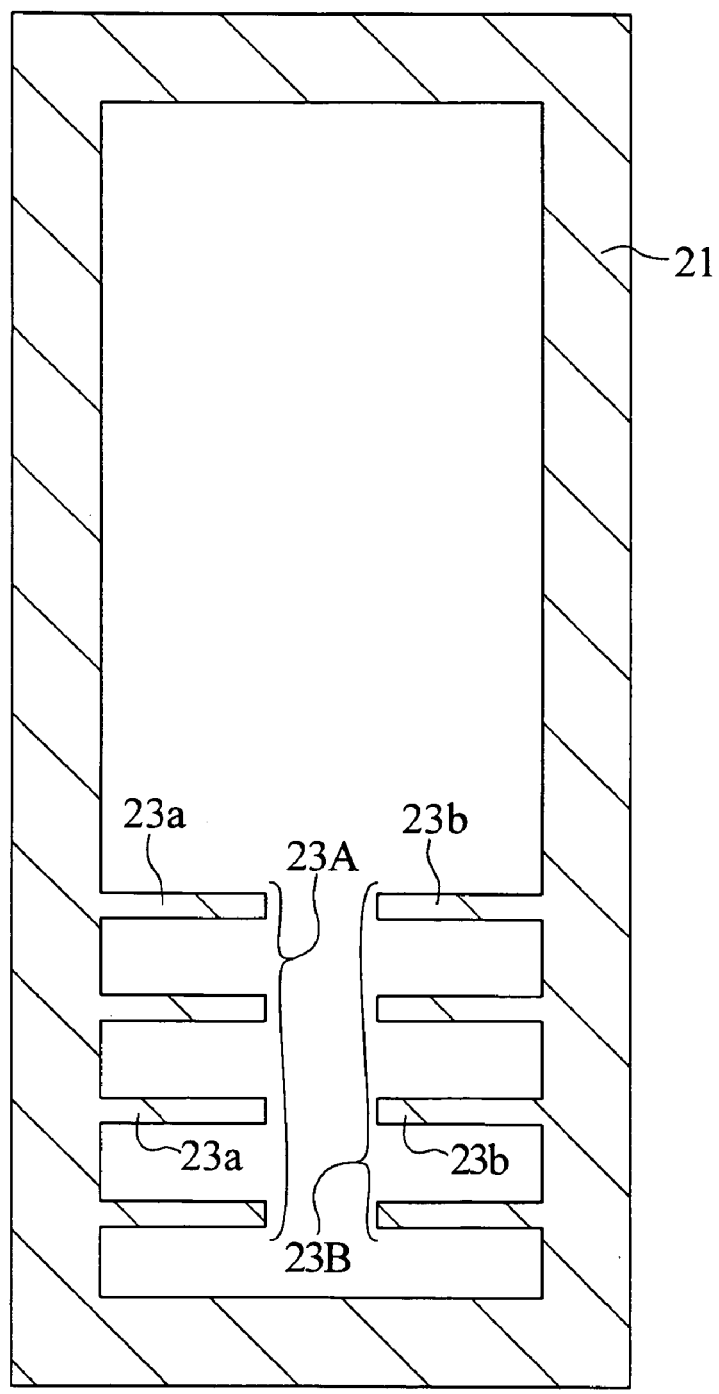
FIG. 2 is a plan view, with partial omission, of the micromirror element shown in FIG. 1.
Figure 3:
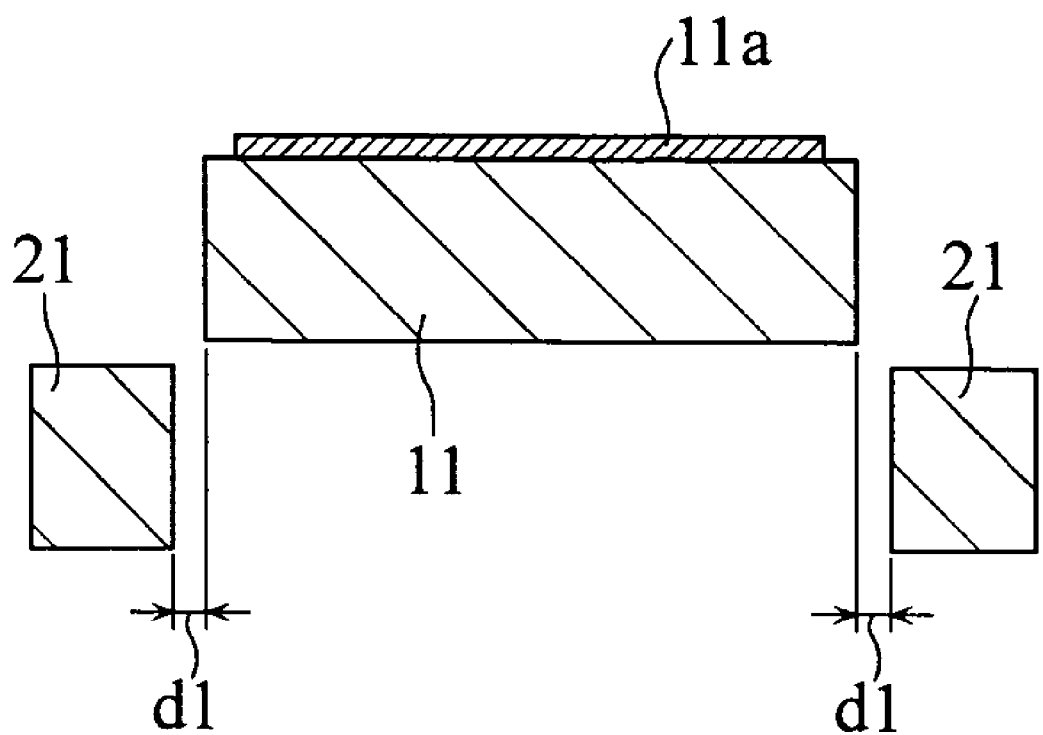
FIG. 3 is a cross-sectional view along the line III-III in FIG. 1.
Figure 4:
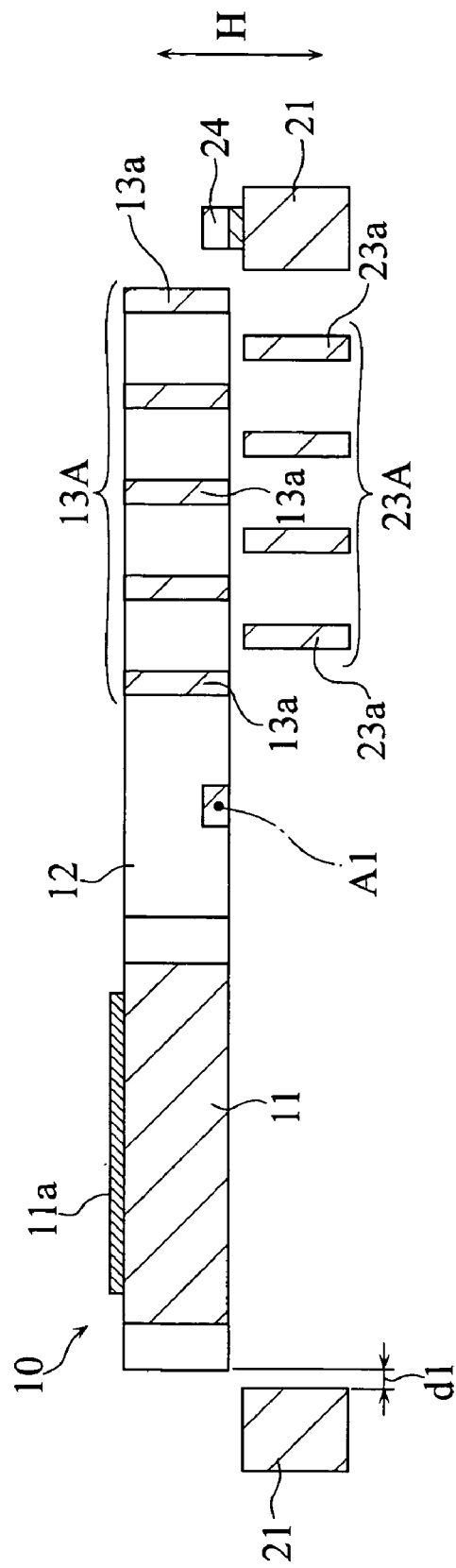
FIG. 4 is a cross-sectional view along the line IV-IV in FIG. 1.
Figure 5:
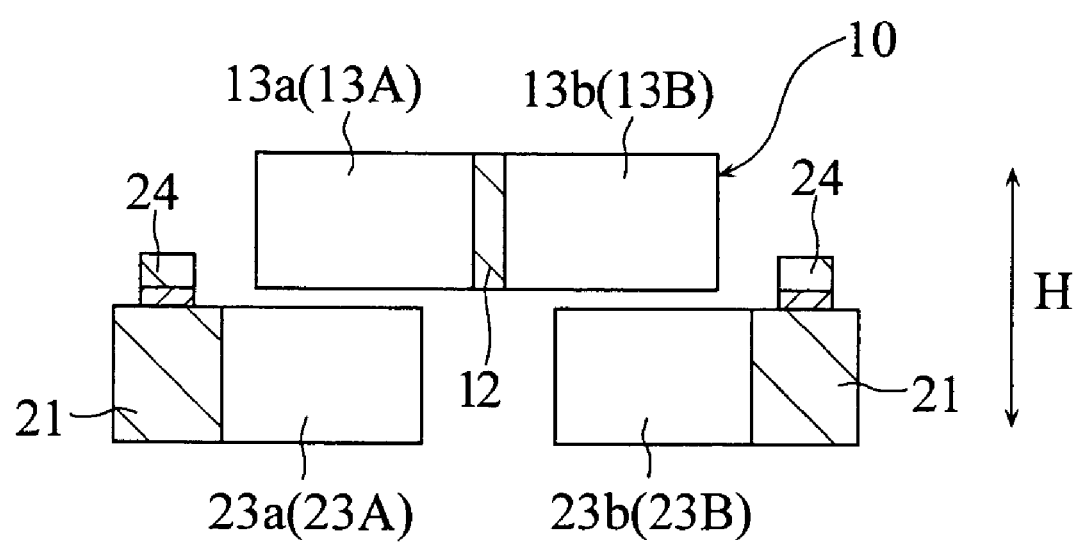
FIG. 5 is a cross-sectional view along the line V-V in FIG. 1.

FIGS. 1-5 illustrate a micromirror element X1 according to a first embodiment of the present invention. FIG. 1 is a plan view of the micromirror element X1. FIG. 2 is plan view, with partial omission, of the micromirror element X1. FIGS. 3-5 are the cross-sectional views along the lines III-III, IV-IV, and V-V in FIG. 1, respectively.

The micromirror element X1 comprises an oscillation section 10, a frame 21, a torsional joining section 22, comb-tooth electrodes 23A, 23B, and a wiring section 24. The micromirror element X1 is manufactured by machining a material substrate, the so-called SOI (silicon on insulator) substrate, by a bulk micromachining technology such as MEMS technology. The material substrate has a laminated structure composed of first and second silicon layers and an insulating layer located between the silicon layers. The silicon layers are provided with the prescribed electric conductivity by doping with dopants. The aforementioned various parts of the micromirror element X1 are formed mainly from the first silicon layer and/or second silicon layer. In order to make the figure clearer, in FIG. 1, the parts derived from the first silicon layer and protruding forward from the paper sheet with respect to the insulating layer are provided with hatching. Further FIG. 2 shows the structure derived from the second silicon layer in the micromirror element X1.

The oscillation section 10 has a mirror support section 11, an arm section 12, and comb-tooth electrodes 13A, 13B. The mirror support section 11 is a section derived from the first silicon layer and corresponds to the movable functional section in the present invention. A mirror surface 11a having a light reflection function is provided on the surface of the mirror support section 11. The mirror surface 11a, for example, has a laminated structure composed of a Cr layer deposited on the first silicon layer and a Au layer on top thereof. The length L1 shown in FIG. 1 with respect to the mirror support section 11 is, for example, 20-300 μm.

The arm section 12 is a part derived mainly from the first silicon layer and extends from the mirror support section 11. The length L2 shown in FIG. 1 with respect to the arm section 12 is, for example, 10-100 μm.

The comb-tooth electrode 13A is composed of a plurality of electrode teeth 13a. A plurality of electrode teeth 13a extend from the arm section 12 and are separated from each other in the extension direction of the arm section 12. The comb-tooth electrode 13B is composed of a plurality of electrode teeth 13b. A plurality of electrode teeth 13b extend from the arm section 12 on the side opposite that of the electrode teeth 13a and are separated from each other in the extension direction of the arm section 12. The electrode teeth 13a, 13b are the parts mainly derived from the first silicon layer. In the present embodiment, as shown in FIG. 1, the extension direction of the electrode teeth 13a, 13b and the extension direction of the arm section 12 are perpendicular to each other, and each of the electrode teeth 13a is arranged to rise in the element thickness direction H, as shown in FIG. 4. The electrode teeth 13b also rise in the element thickness direction H. Further, in the present embodiment, as shown in FIG. 1, the electrode teeth 13a, 13b have a uniform width. Those comb-tooth electrode 13A through the electrode teeth 13a and the comb-tooth electrode 13B through the electrode teeth 13b are electrically connected via the arm section 12.

The frame 21 is a part mainly derived from the second silicon layer, has the prescribed mechanical strength, and supports the structure located inside the frame 21. The width L3 of the frame 21 is, for example, 5-50 μm.

The torsional joining section 22 is composed of a pair of oscillating bars 22a. Each oscillating bar 22a is a part derived mainly from the first silicon layer. The oscillating bars are connected to the arm section 12 of the oscillation section 10 and the frame 21 and join them. The frame 21 and arm section 12 are electrically connected by the oscillating bars 22a. The oscillating bars 22a have a thickness less than that of the arm section 12, as shown in FIG. 4, in the element thickness direction H. Such torsional joining section 22 through a pair of oscillating bars 22a define an oscillation axis A1 for the oscillating action of the oscillation section 10 through mirror support section 11. The oscillation axis A1 is perpendicular to the extension direction of the arm section 12. Therefore, the extension direction of the above-described electrode teeth 13a, 13b extending from the arm section 12 in the direction perpendicular to the extension direction of the arm section 12 is parallel to the oscillation axis A1. Such an oscillation axis A1 preferably passes through the center of gravity of the oscillation section 10 or in the vicinity thereof.

In the present embodiment, a set of oscillating bars formed in a row in the first silicon layer may be provided instead of each oscillating bar 22a. In this case, the spacing between the oscillating bars in the set preferably gradually increases with the transition from the frame 21 to the arm section 12. In the micromirror element X1, the oscillation axis A1 may be also defined by providing two sets of two oscillating bars arranged in a row instead of a pair of oscillating bars 22a. These features may be valid for the micromirror elements to be described below.

The comb-tooth electrode 23A is a part for generating an electrostatic pull-in force in cooperation with the comb-tooth electrode 13A, and is composed of a plurality of electrode teeth 23a. The comb-tooth electrode 23A is the part mainly derived from the second silicon layer and is fixed to the frame 21, as shown in FIG. 1 and FIG. 2. A plurality of electrode teeth 23a extend from the frame 21 and are separated from each other in the extension direction of the arm section 12. In the present embodiment, as shown in FIG. 1, the extension direction of the electrode teeth 23a and the extension direction of the arm section 12 are perpendicular to each other, and the extension direction of the electrode teeth 23a is parallel to the oscillation axis A1. Furthermore, in the present embodiment, as shown in FIG. 1, the electrode teeth 23a have a uniform width. As shown in FIG. 4, each of the electrode teeth 23a is arranged to rise in the element thickness direction H.

Such a comb-tooth electrode 23A with the comb-tooth electrode 13A constitute a drive mechanism. For example, in a non-operative state of the oscillation section 10, the comb-tooth electrodes 13A, 23A are positioned at different heights, as shown in FIG. 4 and FIG. 5. Furthermore, the electrode teeth 13a, 23a are arranged with a shift with respect to each other so that the comb-tooth electrodes 13A, 23A are not in contact with each other during the oscillating action of the oscillation section 10. In the present embodiment, the distance between all the adjacent two electrode teeth 13a is the same, the distance between all the adjacent two electrode teeth 23a is the same, and the electrode tooth 13a positioned between two electrode teeth 23a in the extension direction of the arm section 12 is positioned in the center between the two electrode teeth 23a.

The comb-tooth electrode 23B is a part for generating an electrostatic pull-in force in cooperation with the comb-tooth electrode 13B and is composed of a plurality of electrode teeth 23b. The comb-tooth electrode 23B is the part mainly derived from the second silicon layer and is fixed to the frame 21, as shown in FIG. 1 and FIG. 2. A plurality of electrode teeth 23b extend from the frame 21 and are separated from each other in the extension direction of the arm section 12. The comb-tooth electrode 23B through the electrode teeth 23b are electrically connected to the comb-tooth electrode 23A through the electrode teeth 23a via the frame 21. In the present embodiment, as shown in FIG. 1, the extension direction of the electrode teeth 23b is perpendicular to the extension direction of the arm section 12 and is parallel to the oscillation axis A1. Furthermore, in the present embodiment, as shown in FIG. 1, the electrode teeth 23b have a uniform width and, similarly to the electrode teeth 23a, each of the electrode teeth 23b is arranged to rise in the element thickness direction H.

Such comb-tooth electrode 23B with the comb-tooth electrode 13B constitute a drive mechanism. Specifically, in a non-operative state of the oscillation section 10, the comb-tooth electrodes 13B, 23B are positioned at different heights, as shown in FIG. 5. Furthermore, the electrode teeth 13b, 23b are arranged with a shift with respect to each other so that the comb-tooth electrodes 13B, 23B are not in contact with each other during the oscillating action of the oscillation section 10. In the present embodiment, the distance between all the adjacent two electrode teeth 13b is the same, the distance between all the adjacent two electrode teeth 23b is the same, and the electrode tooth 13b positioned between two electrode teeth 23b in the extension direction of the arm section 12 is positioned in the center between the two electrode teeth 23b.

The wiring section 24 is a part derived from the first silicon layer; it is fixed to the frame 21 via an insulating layer and structurally and electrically connected to each oscillating bar 22a. Further, the wiring section 24 is thinner than the oscillation section 10, as shown in FIG. 4 and FIG. 5, in the element thickness direction H and narrower than the frame 21, as shown in FIG. 1, FIG. 4, and FIG. 5. Such a wiring section 24 is equivalent to the thin narrow structural section in accordance with the present invention.

Figure 6A:
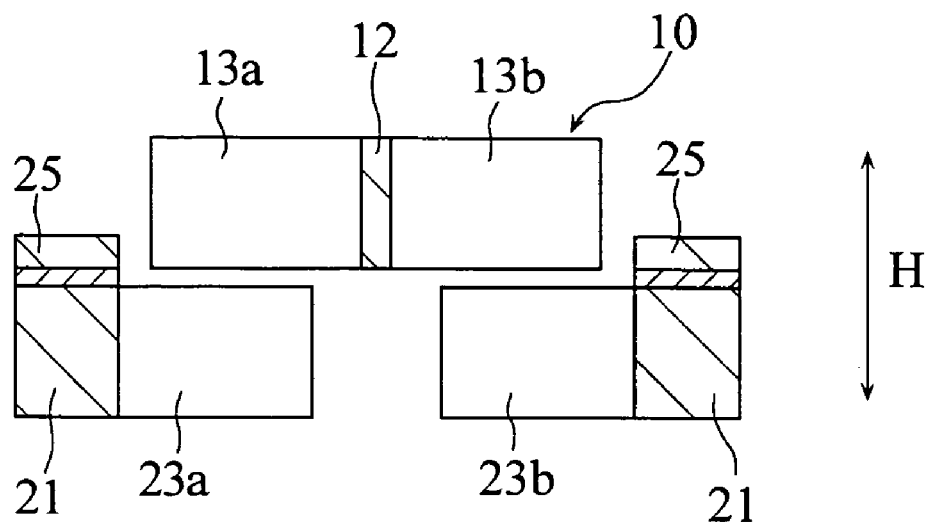
FIGS. 6A-6B are cross-sectional views showing examples of a modified wiring structural section.
Figure 6B:
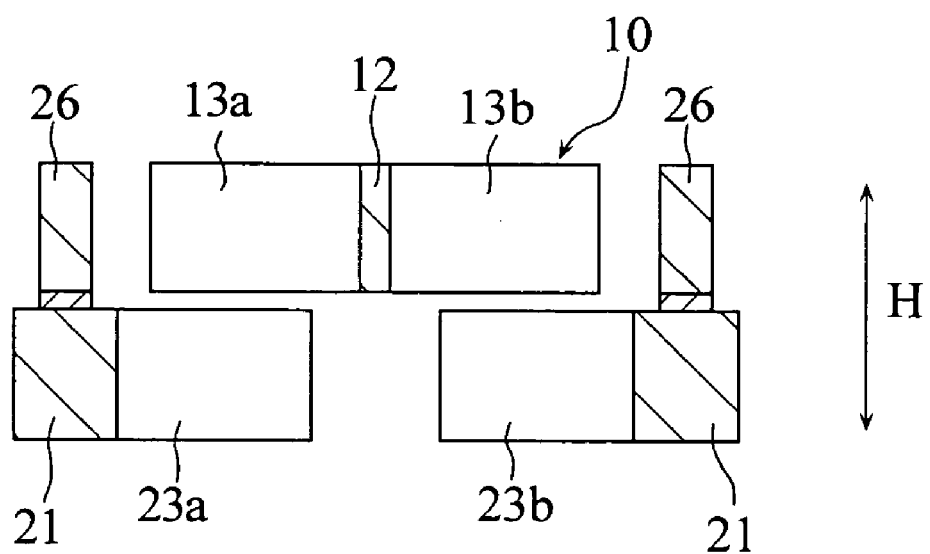

In the micromirror element X1, the wiring section 25 shown in FIG. 6A and the wiring section 26 shown in FIG. 6B may be provided instead of the entire wiring section 24 or part thereof. Similarly to the wiring section 24, the wiring section 25 is a part derived from the first silicon layer and is fixed to the frame 21 via an insulating layer. Further, the wiring section 25 is thinner than the oscillation section 10 in the element thickness direction H and has the same width as the frame 21. Such a wiring section 25 is equivalent to the thin structural section in accordance with the present invention. Similarly to the wiring section 24, the wiring section 26 is a part derived from the first silicon layer and is fixed to the frame 21 via an insulating layer. Further, the wiring section 26 has the same thickness as the oscillation section 10 in the element thickness direction H and is narrower than the frame 21. Such a wiring section 26 is equivalent to the narrow structural section in accordance with the present invention.

FIG. 7 and FIG. 8 illustrate an example of the method for the manufacture of the micromirror element X1. This method is a procedure for manufacturing the micromirror element X1 by bulk micromachining technology. In FIG. 7 and FIG. 8, the process of forming a mirror support section M, arm section AR, frames F1, F2, oscillating bars T1, T2, a set of comb-tooth electrodes E1, E2, and wiring sections W1, W2 shown in FIG. 8D is represented as changes viewed in one cross-section. This one cross-section is represented as a continuous cross-section obtained by simulating the cross-sections in a plurality of prescribed locations contained in a single micromirror element formation area in the material substrate (wafer having a multilayer structure) that is to be machined. The mirror support section M corresponds to a portion of the mirror support section 11. The arm section AR is equivalent to the arm section 12 and represented by a transverse section of the arm section 12. Each of the frames F1, F2 is equivalent to the frame 21 and represented by a transverse section of the frame 21. The oscillating bar T1 is equivalent to the oscillating bar 22a and represented by the cross section in the extension direction of the oscillating bar 22a. The oscillating bar T2 is equivalent to the oscillating bar 22a and represents the cross section of the oscillating bar 22a. The comb-tooth electrode E1 is equivalent to part of the comb-tooth electrodes 13A, 13B and is represented by the transverse section of the comb-tooth electrodes 13a, 13b. The comb-tooth electrode E2 is equivalent to part of the comb-tooth electrodes 23A, 23B and is represented by the transverse section of the electrode teeth 23a, 23b. The wiring sections W1, W2 are equivalent to the wiring section 24 and represented by the transverse section of the wiring section 24.

Figure 7A:
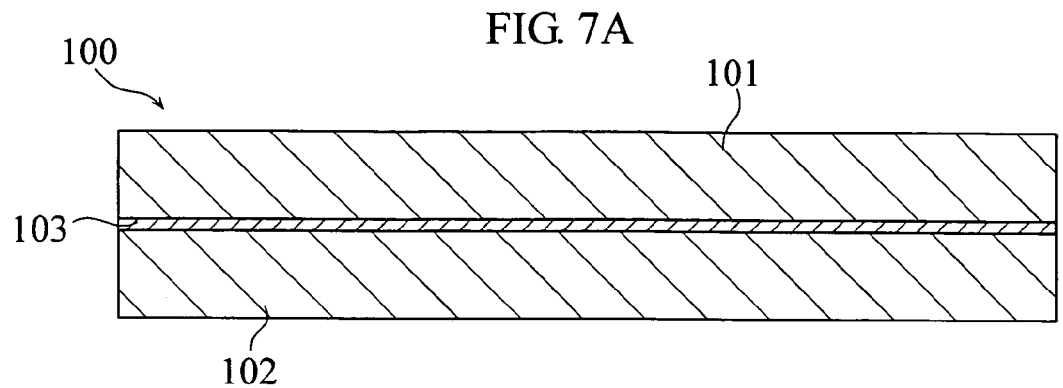
FIGS. 7A-7D illustrate steps of a method for manufacturing the micromirror element shown in FIG. 1.

In the manufacture of the micromirror element X1, first, a material substrate 100 shown in FIG. 7A is prepared. The material substrate 100 is a SOI wafer and has a laminated structure composed of silicon layers 101, 102 and an insulating layer 103 located between the silicon layers 101, 102. The silicon layers 101, 102 are composed of a silicon material provided with electric conductivity by doping with dopants. Here, p-type dopants such as B and n-type dopants such as P and Sb can be employed as the dopants. The insulating layer 103 is composed, for example, of silicon oxide. The thickness of the silicon layer 101 is, for example, 10-100 μm, the thickness of the silicon layer 102 is, for example, 50-500 μm, and the thickness of the insulating layer 103 is, for example, 0.3-3 μm.

Figure 7B:
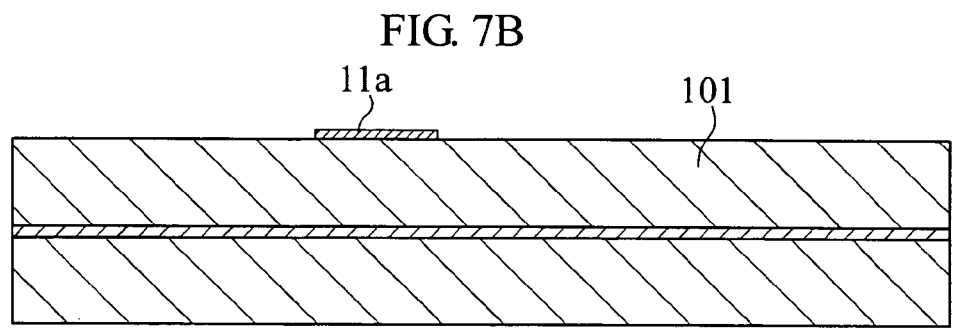

Then, as shown in FIG. 7B, a mirror surface 11a is formed on the silicon layer 101. In the formation of the mirror surface 11a, first, for example, Cr (50 nm) is deposited on the silicon layer 101 by a sputtering method and then Au (200 nm) is deposited. The mirror surface 11a is then patterned by successively etching those metal films via a prescribed mask. For example, an aqueous solution of potassium iodide-iodine can be used as an etchant for Au. For example, an aqueous solution of ammonium cerium nitrate can be used as an etchant for Cr. When an electrode pad is provided in the prescribed zone of the micromirror element X1, the electrode pad may be formed together with the mirror surface. The electrode pad formation method is similar to the method for forming the mirror surface 11a.

Figure 7C:
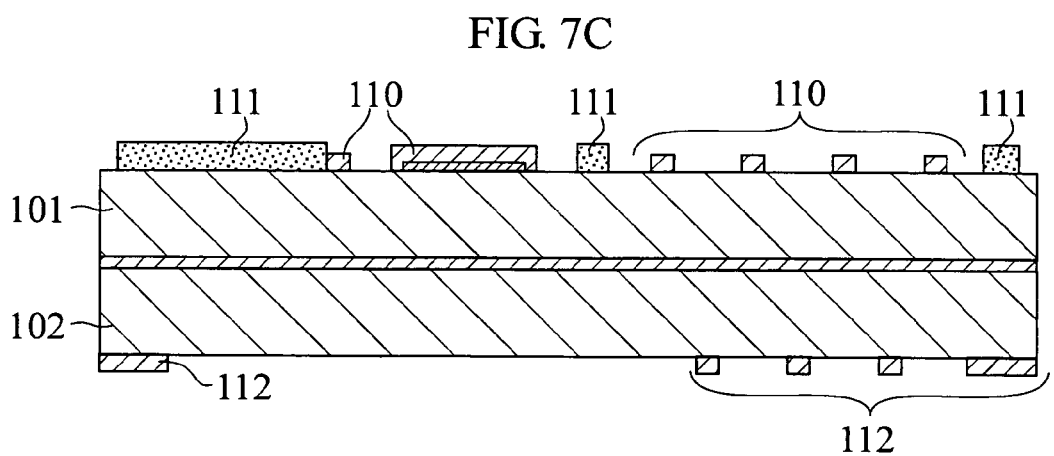

Further, as shown in FIG. 7C, an oxide film pattern 110 and a resist pattern 111 are formed on the silicon layer 101, and an oxide film pattern 112 is formed on the silicon layer 102. The oxide film pattern 110 has a pattern shape corresponding to the oscillation section (mirror support section M, arm section AR, comb-tooth electrode E1). The resist pattern 111 has a pattern shape corresponding to both oscillating bars 22a (oscillating bars T1, T2) and wiring section 24 (wiring sections W1, W2). Furthermore, the oxide film pattern 112 has a pattern shape corresponding to the frame 21 (frame F1, F2) and comb-tooth electrode 23A, 23B (comb-tooth electrode E2).

Figure 7D:
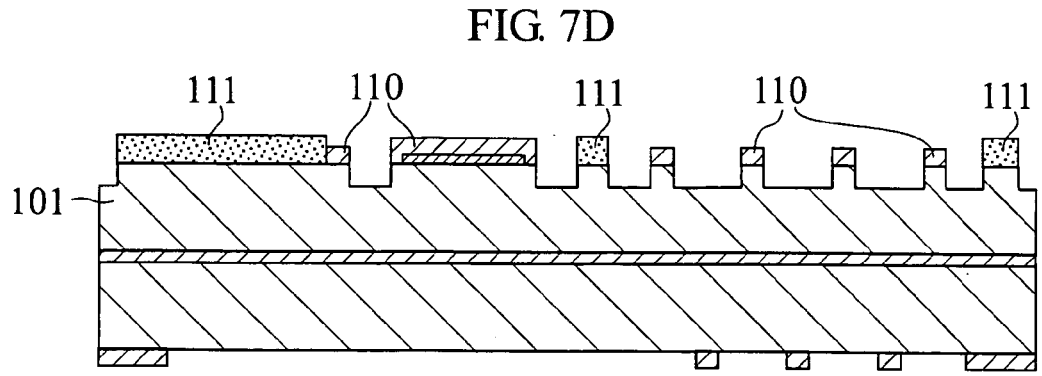

Then, as shown in FIG. 7D, etching of the silicon layer 101 to the prescribed depth is conducted by DRIE (deep reactive ion etching) by using the oxide film pattern 110 and resist pattern 111 as masks. The prescribed depth as referred to herein is a depth corresponding to the thickness of the oscillating bars T1, T2 and wiring sections W1, W2, for example, 5 μm. With the DRIE, good etching can be conducted in a Bosch process where etching and side wall protection are conducted alternately. The Bosch process can be also employed with respect to the subsequent DRIE.

Figure 8A:
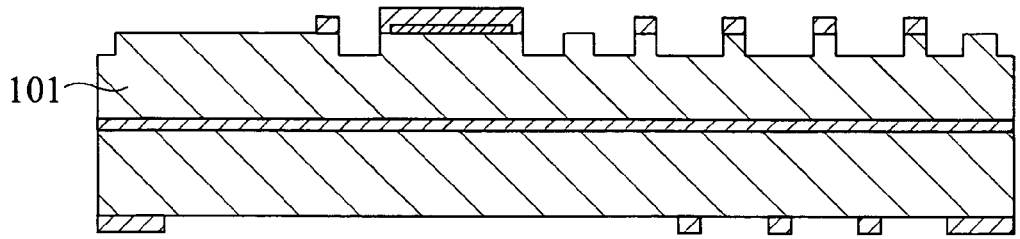
FIGS. 8A-8D show the process implemented after the process illustrated by FIGS. 7A-7D.

Then, as shown in FIG. 8A, the resist pattern 111 is removed by using a remover. For example, AZ Remover (manufactured by Clariant Japan K. K.) can be used.

Figure 8B:
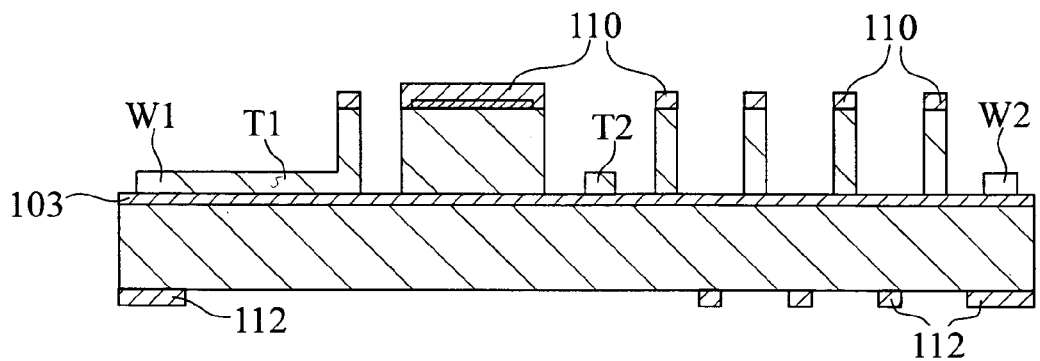

Then, as shown in FIG. 8B, etching of the silicon layer 101 is conducted to the insulating layer 103, while retaining and forming the oscillating bars T1, T2 and wiring sections W1, W2, by the DRIE using the oxide film pattern 110 as a mask. The oscillation section 10 (mirror support section M, arm section AR, comb-tooth electrode E1), both oscillating bars 22a (oscillating bars T1, T2), and wiring section 24 (wiring sections W1, W2) are formed by such etching.

Figure 8C:
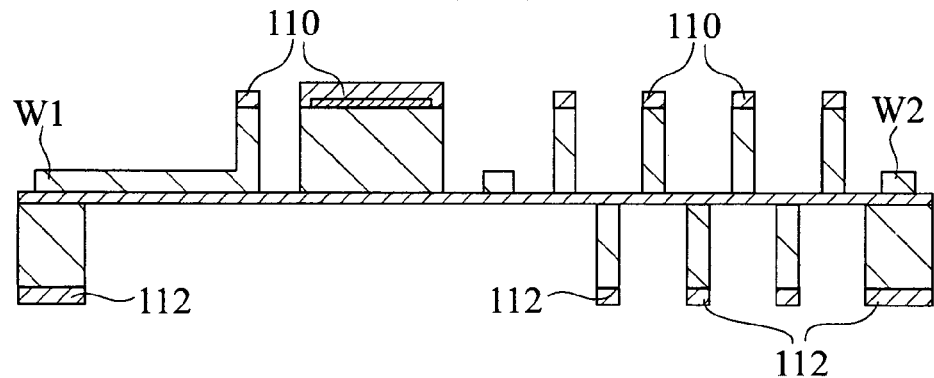

Then, as shown in FIG. 8C, etching of the silicon layer 102 is conducted to the insulating layer 103 by the DRIE using the oxide film pattern 112 as a mask. The frame 21 (frames F1, F2 and comb-tooth electrodes 23A, 23B (comb-tooth electrode E2) are formed by such etching.

Figure 8D:
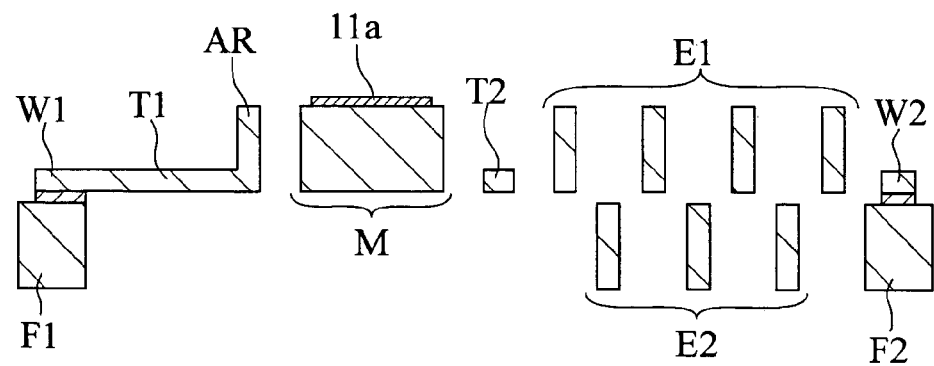

Then, as shown in FIG. 8D, the zones exposed in the insulating layer 103 and the oxide film patterns 110, 112 are etched out. Dry etching or wet etching can be employed as the etching method. When drying etching is employed, for example, $CF_4$ or $CHF_3$ can be used as the etching gas. When wet etching is employed, for example, a buffered hydrofluoric acid (BHF) composed of hydrofluoric acid and ammonium fluoride can be used as the etching solution.

With the above-described sequence of operations, the micromirror element X1 can be manufactured by forming mirror support section M, arm section AR, frames F1, F2, oscillating bars T1, T2, a set of comb-tooth electrodes E1, E2, and wiring sections W1, W2.

In the micromirror element X1, the oscillation section 10 through mirror support section 11 can be rotary displaced around the oscillation axis A1 by applying, if necessary, the prescribed electric potential to the comb-tooth electrodes 13A, 13B, 23A, 23B. The application of electric potential to the comb-tooth electrodes 13A, 13B can be realized via the wiring section 24, both oscillating bars 22a, and arm section 12. The comb-tooth electrodes 13A, 13B are, for example, grounded. On the other hand, the application of electric potential to the comb-tooth electrodes 23A, 23B can be realized via the frame 21. The frame 21 and wiring section 24 are electrically separated by an insulating layer (for example, the above-described insulating layer 103), as described hereinabove.

Figure 9:
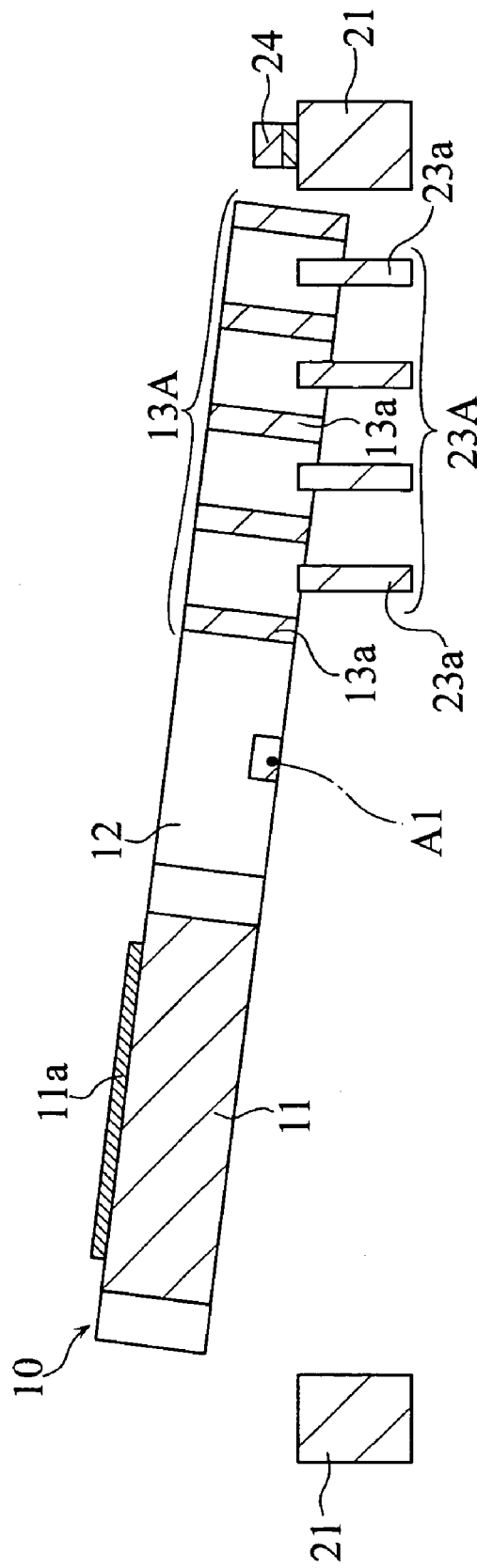
FIG. 9 is a cross-sectional view along the line IV-IV in FIG. 1, showing the micromirror element in operation.

If the desired electrostatic pull-in force is generated between the comb-tooth electrodes 13A, 23A and between the comb-tooth electrodes 13B, 23B by applying the respective prescribed electric potentials between the comb-tooth electrodes 13A, 13B, 23A, 23B, the comb-tooth electrode 13A is pulled in to the comb-tooth electrode 23A, and the comb-tooth electrode 13B is pulled in to the comb-tooth electrode 23B. As a result, the oscillation section 10 through the mirror support section 11 are turned around the oscillation axis A1 and rotary displaced to the angle where the electrostatic pull-in force is balanced by the sum of the torsion resistance forces of oscillating bars 22a. In the equilibrium state, the comb-tooth electrodes 13A, 23A are oriented, for example, as shown in FIG. 9. The comb-tooth electrodes 13B, 23B also assume a similar orientation. The rotary displacement quantity in such oscillating action can be adjusted by adjusting the electric potential applied to the comb-tooth electrodes 13A, 13B, 23A, 23B. Further, if the electrostatic pull-in force between the comb-tooth electrodes 13A, 23A and the electrostatic pull-in force between the comb-tooth electrodes 13B, 23B are cancelled, each oscillating bar 22a returns to its natural state, and the oscillation section 10 through the mirror support section 11 assume the orientation shown in FIG. 4. The reflection direction of light reflected by the mirror surface 11a provided on the mirror support section 11 can be appropriately switched by the above-described oscillating action of the oscillation section 10 through mirror support section 11.

In the micromirror element X4 described above, it is necessary to form between the mirror support section 81 and frame 91 a gap G having an aspect ratio D/d4 below the prescribed level (that is, a gap G having a length above the prescribed level in the in-plane direction of the material substrate), this requirement hindering the miniaturization of the element. By contrast, in the micromirror element X1, the mirror support section 11 and frame 21 are the parts formed by different etching processes in different electrically conductive layers. Therefore, when the mirror support section 11 and frame 21 are formed, it is not necessary to form a gap with an aspect ration below the prescribed level (that is, a gap with a length above the prescribed level in the in-plane direction of the material substrate) between the mirror support section 11 and frame 21. In the micromirror element X1, the separation distance d1 of the mirror support section 11 and frame 21 in the in-plane direction of material substrate may be a minimum length necessary to avoid the contact of the mirror support section 11 with the frame 21 during oscillating action of the oscillation section 10. Therefore, the micromirror element X1 is adapted for miniaturization.

In the micromirror element X1, a plurality of electrode teeth 13a of the comb-tooth electrode 13A are separated from each other in the extension direction of the arm section 12 extending from the mirror support section 11 and are supported by the arm section 12. Furthermore, a plurality of electrode teeth 23a of the comb-tooth electrode 23A are separated from each other in the extension direction of the arm section 12 and supported by the frame 21. On the other hand, a plurality of electrode teeth 13b of the comb-tooth electrode 13B are separated from each other in the extension direction of the arm section 12 extending from the mirror support section 11 and are supported by the arm section 12, and a plurality of electrode teeth 23b of the comb-tooth electrode 23B are separated from each other in the extension direction of the arm section 12 and supported by the frame 21. Those electrode teeth 13a, 13b, 23a, 23b are not directly supported by the mirror support section 11. As a result, the number of the electrode teeth 13a, 23a constituting a set of comb-tooth electrodes 13A, 23A and the number of electrode teeth 13b, 23b constituting a set of comb-tooth electrodes 13B, 23B are not restricted by the length of the mirror support section 11 in the extension direction of the oscillation axis A1 that is perpendicular to the extension direction of the arm section 12. Therefore, in the micromirror element X1, the surface area over which the electrode teeth 13a, 23a can face each other and the surface area over which the electrode teeth 13b, 23b can face each other can be ensured by providing the desired number of electrode teeth 13a, 13b, 23a, 23b, regardless of the designed dimensions of the mirror support section 11 in the direction of the oscillation axis A1. In the micromirror element X1, for example, in addition to ensuring the surface area over which the electrode teeth 13a, 23a can face each other in a set of comb-tooth electrodes 13A, 23A, it is not necessary to reduce the width and increase the extension length of the electrode teeth 13a, 23a, such operations degrading the mechanical strength of the electrode teeth 13a, 23a, and it is not necessary to decrease the gap between the electrode teeth, such a decrease causing problems in the element manufacturing process. Thus, the micromirror element X1 is adapted for miniaturization by setting small designed dimensions of the mirror support section 11 in the direction of the oscillation axis A1, that is, small designed dimensions of the entire element, while ensuring the drive force for the oscillating action of the oscillation section 10 by providing the desired number of electrode teeth 13a, 13b, 23a, 23b, regardless of the designed dimensions of the mirror support section 11 in the direction of the oscillation axis A1.

Figure 10:
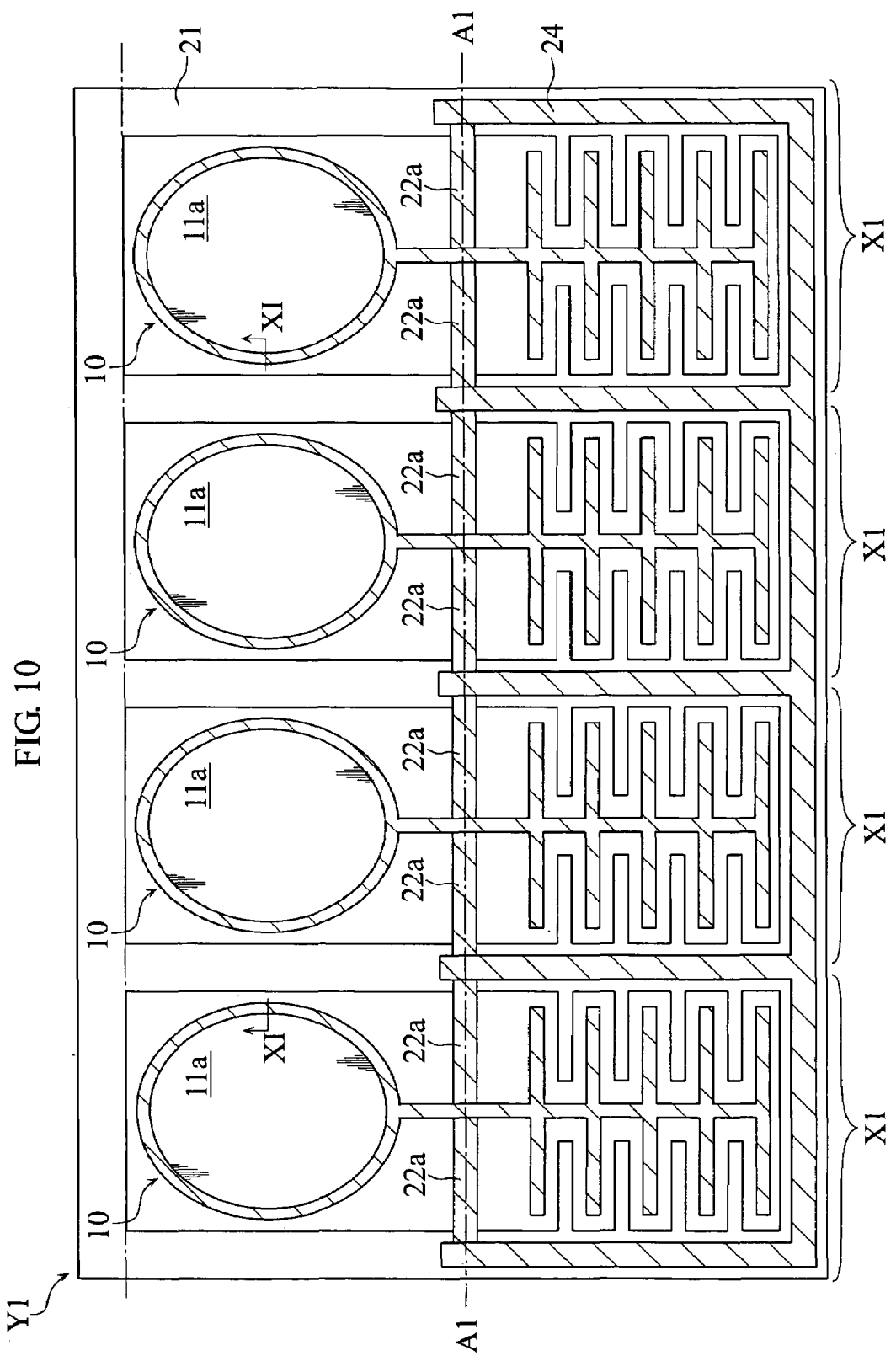
FIG. 10 shows a micromirror array comprising a plurality of micromirror elements shown in FIG. 1.
Figure 11:
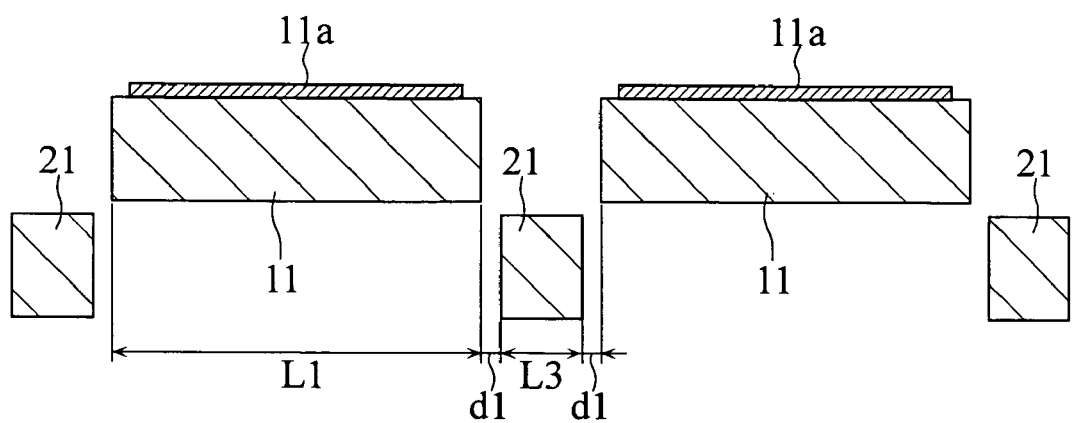
FIG. 11 is a cross-sectional view along the line XI-XI in FIG. 10.

FIG. 10 shows a micromirror array Y1 comprising a plurality of micromirror elements X1. In order to make the figure clearer, in FIG. 10, the oscillation section 10, frame 21, and wiring section 24 are represented by hatching. Further, FIG. 11 is an enlarged cross-sectional view along the line XI-XI in FIG. 10. In the micromirror array Y1, a plurality of micromirror elements X1 are arranged in a row in the direction of the oscillation axis A1. Therefore, in the micromirror array Y1, a plurality of mirror surfaces 11a are arranged in a row in the direction of the oscillation axis A1. The arrangement pitch of a plurality of mirror surfaces 11a is represented by L1+L3+2d1, as shown in FIG. 11.

As described hereinabove, the separation distance d1 of the mirror support section 11 and frame 21 in the in-plane direction of the material substrate may be a minimum length necessary to avoid the contact of the mirror support section 11 with the frame 21 during the oscillating action of the oscillation section 10. In addition, the micromirror element X1 has a drive mechanism (comb-tooth electrodes 13A, 13B, 23A, 23B) of a structure adapted for shortening in the direction of the oscillation axis A1. Therefore, in the micromirror array Y1, a short arrangement pitch can be realized for a plurality of mirror surfaces 11a. Thus, in the micromirror array Y1, a plurality of mirror surfaces 11a can be arranged with a high density in the direction of the oscillation axis A1.

Figure 12:
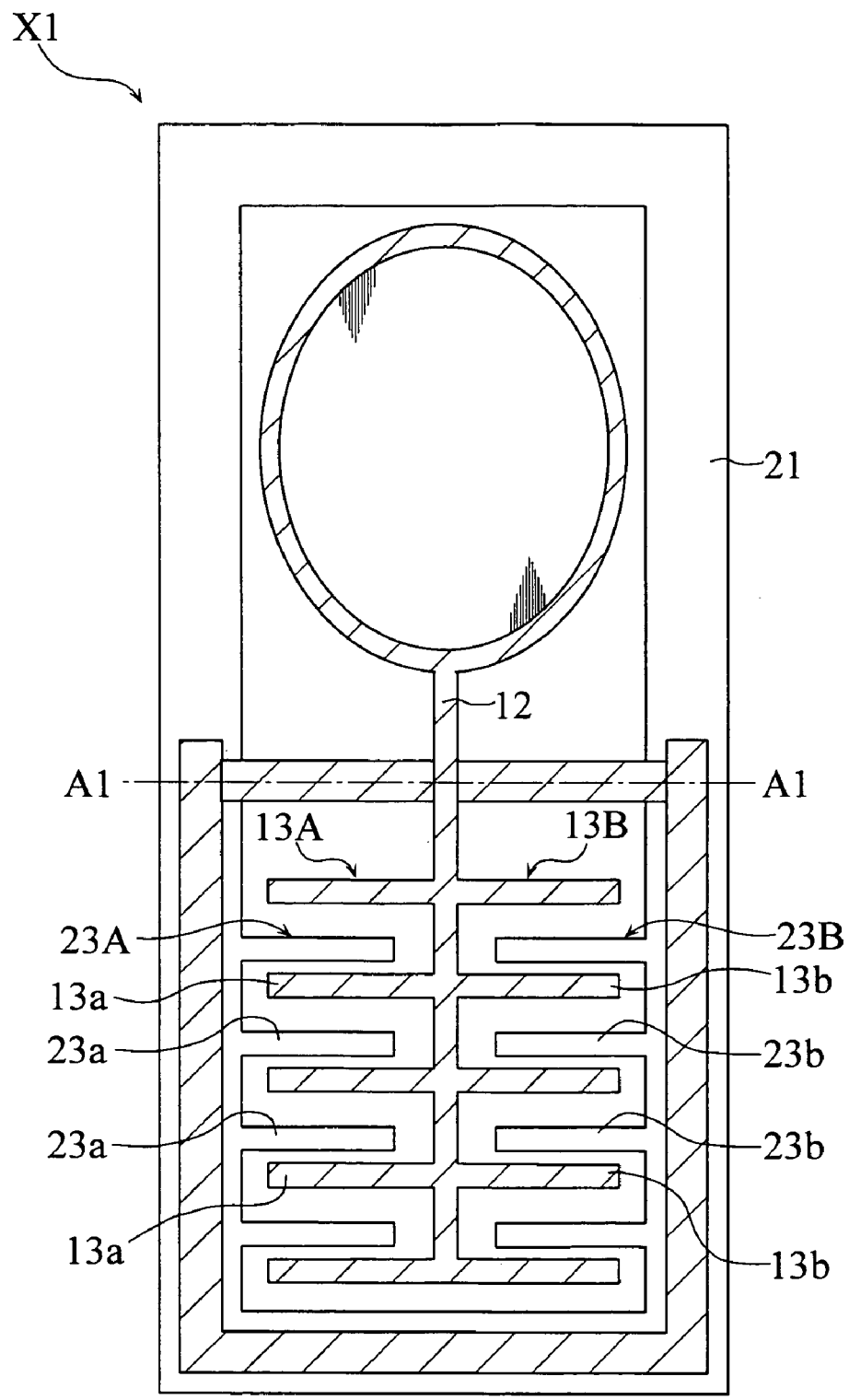
FIG. 12 is a plan view showing a first modification of the micromirror element shown in FIG. 1.

FIG. 12 is a plan view of the first modification example of the micromirror element X1. In the present modification example, the electrode teeth 13a positioned between two adjacent electrode teeth 23a in the extension direction of the arm section 12 are shifted from the central position between the two electrode teeth 23a so as to be closer to the oscillation axis A1, or the electrode teeth 23a positioned between two adjacent electrode teeth 13a in the extension direction of the arm section 12 are shifted from the central position between the two electrode teeth 13a so as to be farther from the oscillation axis A1. At the same time, the electrode teeth 13b positioned between two adjacent electrode teeth 23b in the extension direction of the arm section 12 are shifted from the central position between the two electrode teeth 23b so as to be closer to the oscillation axis A1, or the electrode teeth 23b positioned between two adjacent electrode teeth 13b in the extension direction of the arm section 12 are shifted from the central position between the two electrode teeth 13b so as to be farther from the oscillation axis A1.

Figure 13:
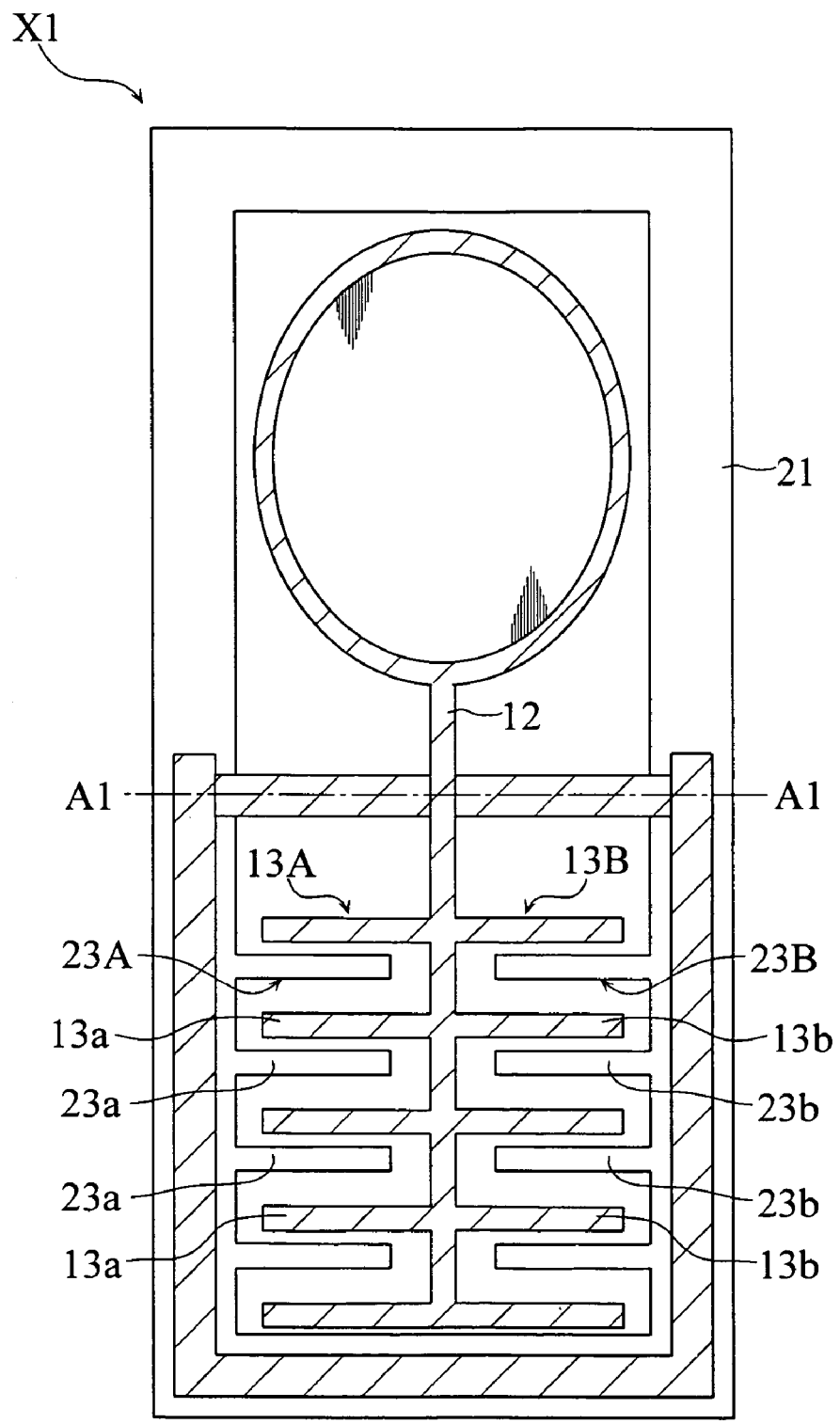
FIG. 13 is a plan view showing a second modification of the micromirror element shown in FIG. 1.

FIG. 13 is a plan view of the second modification example of the micromirror element X1. In the present modification example, the electrode teeth 13a positioned between two adjacent electrode teeth 23a in the extension direction of the arm section 12 are shifted from the central position between the two electrode teeth 23a so as to be farther from the oscillation axis A1, or the electrode teeth 23a positioned between two adjacent electrode teeth 13a in the extension direction of the arm section 12 are shifted from the central position between the two electrode teeth 13a so as to be closer to the oscillation axis A1. At the same time, the electrode teeth 13b positioned between two adjacent electrode teeth 23b in the extension direction of the arm section 12 are shifted from the central position between the two electrode teeth 23b so as to farther from to the oscillation axis A1, or the electrode teeth 23b positioned between two adjacent electrode teeth 13b in the extension direction of the arm section 12 are shifted from the central position between the two electrode teeth 13b so as to be closer to the oscillation axis A1.

The configurations of the first and second modification examples are sometimes advantageous for inhibiting the generation of the so-called pull-in effect when the element is driven in a set of comb-tooth electrodes 13A, 23A and a set of comb-tooth electrodes 13B, 23B. When the element is driven, as described hereinabove, the desired electrostatic pull-in force is generated between the comb-tooth electrodes 13A, 23A and between comb-tooth electrodes 13B, 23B, the combtooth electrode 13A is pulled in to the comb-tooth electrode 23A, and the comb-tooth electrode 13B is pulled in to the comb-tooth electrode 23B. In the micromirror element X1 in which the comb-tooth electrodes 13A 23A have the structure shown in FIGS. 1, 4, 5, after the comb-tooth electrode 13A has been pulled in to the comb-tooth electrode 23A, the distance between one electrode tooth 13a and the electrode tooth 23a adjacent to the electrode tooth 13a on the outer side of the electrode tooth 13a with respect to the oscillation axis A1 can be shorter or longer that the distance between the electrode tooth 13a and the other electrode tooth 23a that is adjacent to the electrode tooth 13a on the inner side of the electrode tooth 13a with respect to the oscillation axis A1, depending on the position of the oscillation axis A1 in the element thickness direction H. When it is shorter, the electrostatic pull-in force (first electrostatic pull-in force) between the electrode tooth 13a and the electrode tooth 23a on the outer side tends to be larger than the electrostatic pull-in force (second electrostatic pull-in force) between the electrode tooth 13a and the electrode tooth 23a on the inner side. If the first electrostatic pull-in force is larger than the second electrostatic pull-in force by the prescribed value or more, the electrode tooth 13a and the electrode tooth 23a on the outer side improperly pull against each other, easily causing the pull-in effect. When the second electrostatic pull-in force is larger than the first electrostatic pull-in force by the prescribed value or more, the electrode tooth 13a and the electrode tooth 23a on the outer side improperly pull against each other, easily causing the pull-in effect. Similarly, in the micromirror element X1 in which the comb-tooth electrodes 13B, 23B have the structure shown in FIGS. 1, 5, the pull-in effect sometimes easily occurs in the comb-tooth electrodes 13B, 23B. The occurrence of the pull-in effect is undesirable because it degrades the oscillation characteristic of the element.

By contrast, in the first or second modification example where an electrode tooth 13a positioned between two electrode teeth 23a adjacent in the extension direction of the arm section 12 is shifted toward the electrode tooth 23a on the inner side or outer side from the central position between the two electrode teeth 23a in a state where the oscillation section 10 is not rotary displaced, the distance between one electrode tooth 13a and the electrode tooth 23a on the outer side and the distance between the electrode tooth 13a and the electrode tooth 23a on the inner side sometimes can be made substantially equal to each other, in the state where the oscillation section 10 is rotary displaced and the comb-tooth electrode 13A is pulled in to the comb-tooth electrodes 23A, 23B, by appropriately setting the shift quantity correspondingly to the position of the oscillation axis A1 in the element thickness direction H. In this case, the occurrence of the pull-in effect in the comb-tooth electrodes 13A, 23A can be inhibited. Similarly, with the configuration of the first and second modification examples, the occurrence of the pull-in effect sometimes can be inhibited in the comb-tooth electrodes 13B, 23B.

Figure 14:
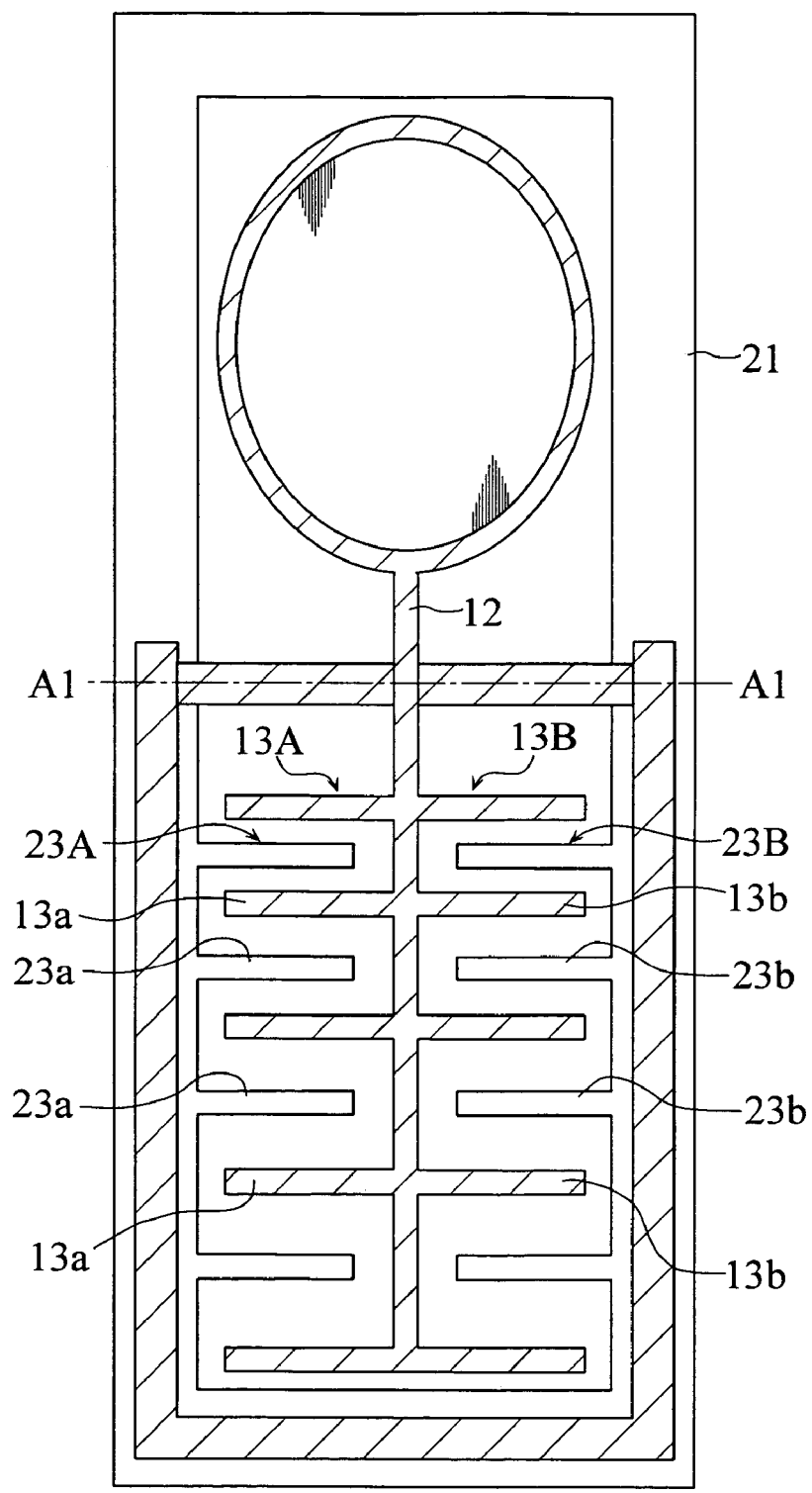
FIG. 14 is a plan view showing a third modification of the micromirror element shown in FIG. 1.

FIG. 14 is a plan view of the third modification example of the micromirror element X1. In this modification example, the size of the frame 21 and the size of the arm section 12 in the extension direction of the arm section 12 are increased and the distance between two adjacent electrode teeth 13a, the distance between two adjacent electrode teeth 13b, the distance between two adjacent electrode teeth 23a, and the distance between two adjacent electrode teeth 23b increases with the distance from the oscillation axis A1.

The increase in the displacement quantity of the electrode teeth 13a, 13b in the electrode teeth separation direction (extension direction of the arm section 12) during oscillating action of the oscillation section 10 with the distance from the oscillation axis is advantageous from the standpoints of obtaining the same distance between all the electrode teeth 13a, 23a and obtaining the same distance between all the electrode teeth 13b, 23b in a state in the present modification example where the oscillation section 10 is rotary displaced when the element is driven and the comb-tooth electrodes 13A, 13B are pulled in to comb-tooth electrodes 23A, 23B, respectively. Obtaining the same distance between all the electrode teeth 13a, 23a when the element is driven makes it possible to generate a uniform electrostatic pull-in force over the entire range between the comb-tooth electrodes 13A, 23A when the element is driven. Similarly, obtaining the same distance between all the electrode teeth 13b, 23b when the element is driven makes it possible to generate a uniform electrostatic pull-in force over the entire range between the comb-tooth electrodes 13B, 23B when the element is driven.

Figure 15:
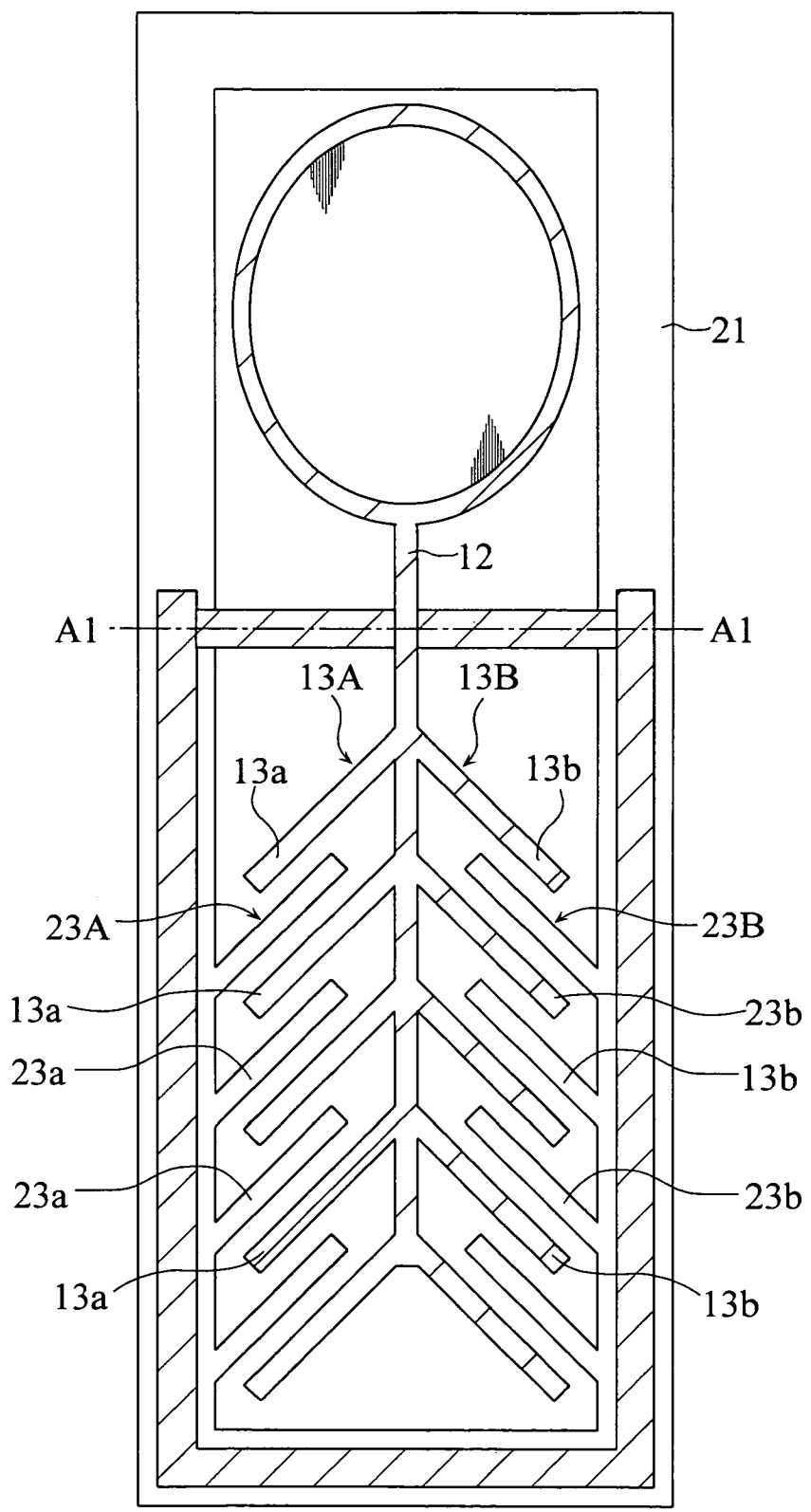
FIG. 15 is a plan view showing a fourth modification of the micromirror element shown in FIG. 1.

FIG. 15 is a plan view of the fourth modification example of the micromirror element X1. In the present modification example, the extension direction of a plurality of electrode teeth 13a, 13b of the comb-tooth electrodes 13A, 13B and the extension direction of a plurality of electrode teeth 23a, 23b of the comb-tooth electrodes 23A, 23B are not perpendicular to the extension direction of the arm section 12, the extension directions of the electrode teeth 13a, 23a are parallel to each other, and the extension directions of the electrode teeth 13b, 23b are parallel to each other. The acute angle formed by the extension direction of the electrode teeth 13a, 13b, 23a, 23b and the extension direction of the arm section 12 is, for example, 45°. The micromirror element X1 may have the comb-tooth electrodes 13A, 13B, 23A, 23B of such a structure.

Figure 16:
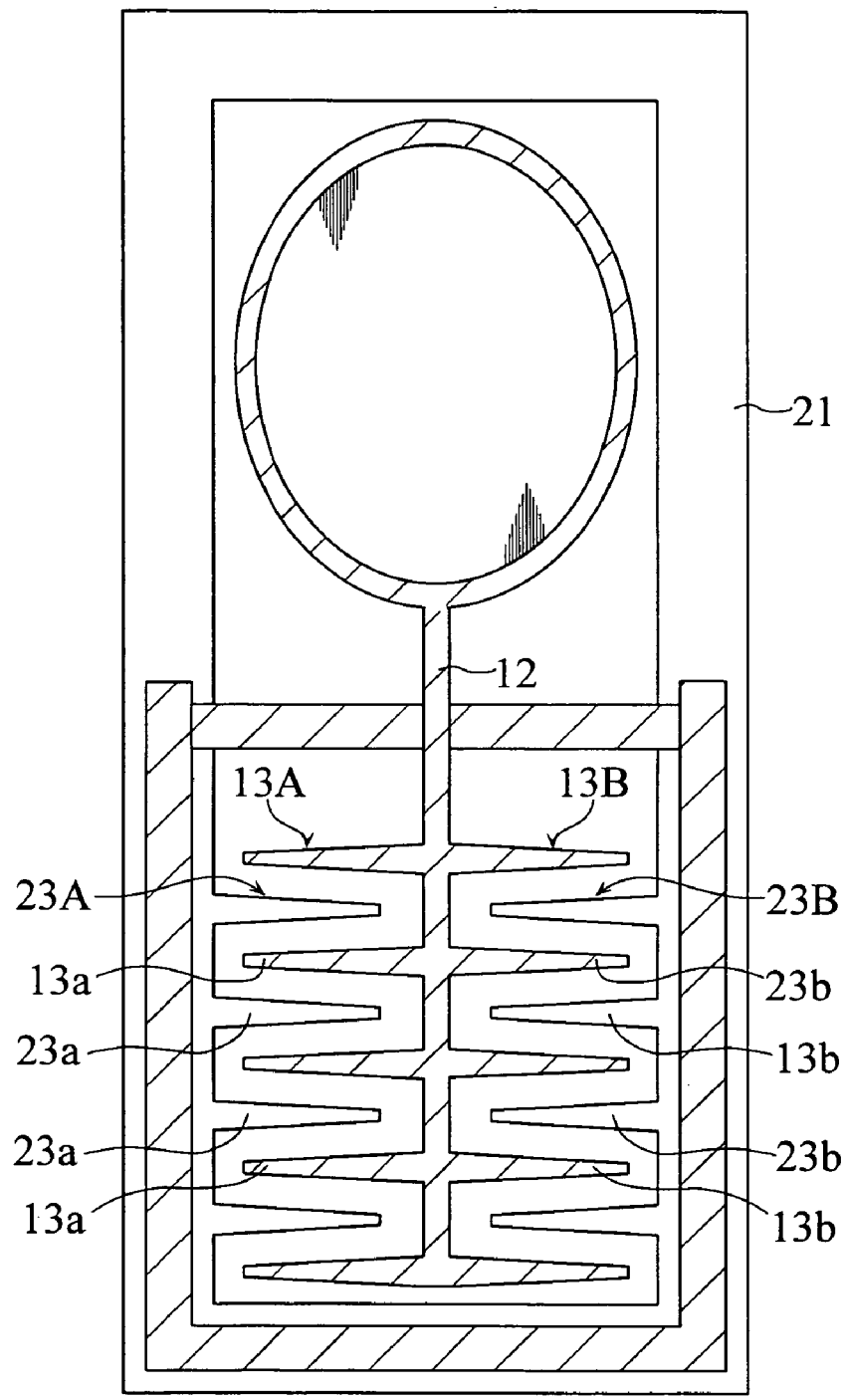
FIG. 16 is a plan view showing a fifth modification of the micromirror element shown in FIG. 1.

FIG. 16 is a plan view of the fifth modification example of the micromirror element X1. In the present modification example, both side surfaces of the electrode teeth 13a, 13b are not perpendicular with respect to the side surface of the arm section 12, and the width of the electrode teeth 13a, 13b decreases with the distance from the arm section 12. At the same time, both side surfaces of the electrode teeth 23a, 23b are not perpendicular with respect to the side surface of the frame 21, and the width of the electrode teeth 23a, 23b decreases with the distance from the frame 21.

Such a configuration is advantageous for preventing the electrode teeth 13a, 23a or the electrode teeth 13b, 23b from coming too close to each other after the oscillation section 10 was rotary displaced and the comb-tooth electrodes 13A, 13B were pulled in to the comb-tooth electrodes 23A, 23B, respectively, when the element was driven. Preventing the electrode teeth 13a, 23a from coming too close to each other when the element is driven makes it possible to inhibit the occurrence of the pull-in effect in the comb-tooth electrodes 13A, 23A when the element is driven. Similarly, preventing the electrode teeth 13b, 23b from coming too close to each other when the element is driven makes it possible to inhibit the occurrence of the pull-in effect in the comb-tooth electrodes 13B, 23B when the element is driven.

Figure 17:
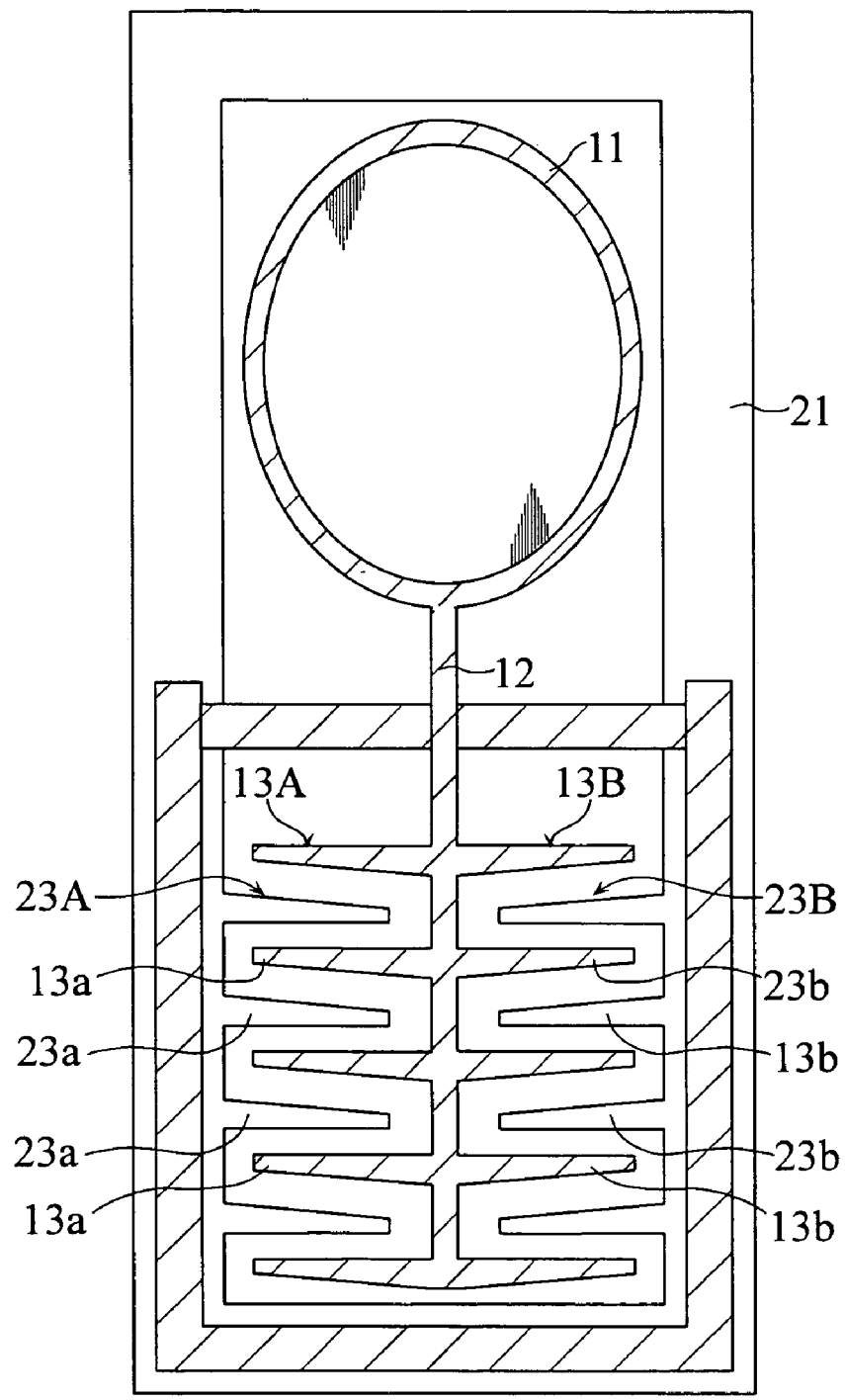
FIG. 17 is a plan view showing a sixth modification of the micromirror element shown in FIG. 1.

FIG. 17 is a plan view of the sixth modification example of the micromirror element X1. In the present modification example, the side surfaces of the electrode teeth 13a, 13b facing the mirror support section 11 are perpendicular to the side surface of the arm section 12, the side surfaces on the other side of the electrode teeth 13a, 13b are not perpendicular to the side surface of the arm section 12, and the width of the electrode teeth 13a, 13b decreases with the distance from the arm section 12. At the same time, the side surfaces of the electrode teeth 23a, 23b facing the mirror support section 11 are not perpendicular to the side surface of the frame 21, the side surfaces on the other side of the electrode teeth 23a, 23b are not perpendicular to the side surface of the frame 21, and the width of the electrode teeth 23a, 23b decreases with the distance from the frame 21.

Such a configuration is especially advantageous for preventing the electrode teeth 13a and electrode teeth 23a on the outer side or the electrode teeth 13b and electrode teeth 23b on the outer side from coming too close to each other after the oscillation section 10 was rotary displaced and the comb-tooth electrodes 13A, 13B were pulled in to the comb-tooth electrodes 23A, 23B, respectively, when the element was driven.

Figure 18:
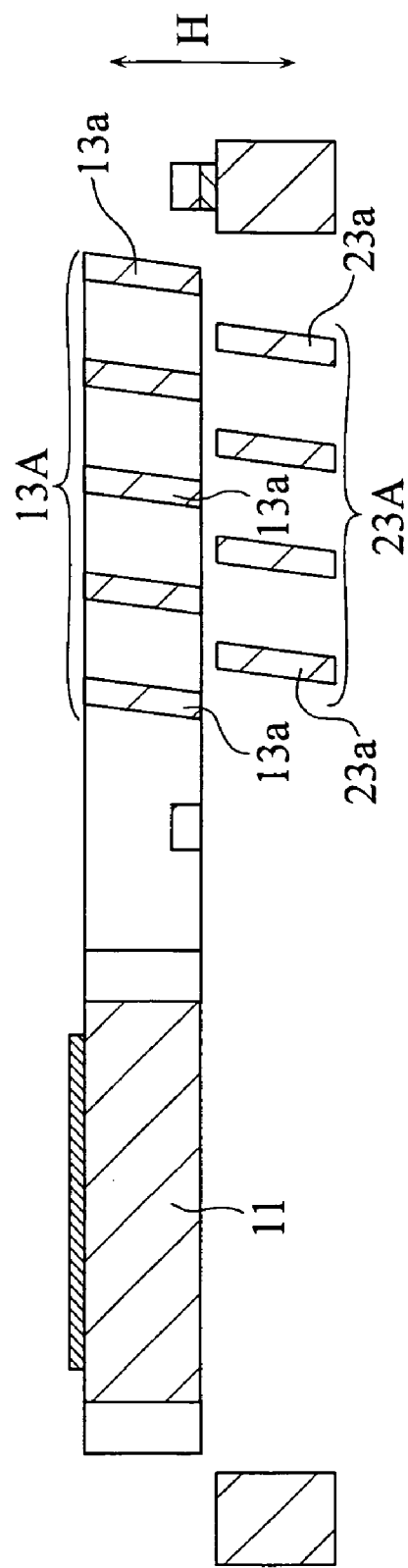
FIG. 18 is a sectional view showing a seventh modification of the micromirror element shown in FIG. 1.

FIG. 18 is a cross-sectional view corresponding to line IV-IV in FIG. 1, this view illustrating the seventh modification example of the micromirror element X1. In the present modification example, when the oscillation section 10 is not operated, the rise direction of the electrode teeth 13a is inclined with respect to the element thickness direction H. More specifically, the electrode teeth 13a are so tilted as to approach the mirror support section 11 as they approach the electrode teeth 23a. At the same time, the electrode teeth 23a are so tilted as to be farther from the mirror support section 11 as they approach the electrode teeth 13a. In the present modification example, the electrode teeth 13b, 23b are also tilted similarly to the electrode teeth 13a, 23a.

The orientation of the comb-tooth electrode 13A with respect to the comb-tooth electrode 23A when the oscillation section 10 is not operated is different from the orientation of the comb-tooth electrode 13A with respect to the comb-tooth electrode 23A after the oscillation section 10 was rotary displaced and the comb-tooth electrode 13A was pulled in to the comb-tooth electrode 23A. When the comb-tooth electrodes 13A, 23A have the structure shown in FIGS. 1, 4, 5, changes in the orientation are comparatively large. By contrast, the comb-tooth electrodes 13A, 23A of the present modification example have electrode teeth 13a, 23a that are inclined in advance in the direction in which the electrode teeth 13a are inclined when the comb-tooth electrode 13A is pulled in to the comb-tooth electrode 23A. Therefore, changes in the orientation between the non-operative state and operative state are comparatively small. Similarly, the comb-tooth electrodes 13B, 23B of the present modification example have electrode teeth 13b, 23b that are inclined in advance in the direction in which the electrode teeth 13b are inclined when the comb-tooth electrode 13B is pulled in to the comb-tooth electrode 23B. Therefore, changes in the orientation between the non-operative state and operative state are comparatively small. Such an inhibition of orientation changes is advantageous in terms of generating a stable electrostatic pull-in force between the comb-tooth electrodes 13A and 23A and between the comb-tooth electrodes 13B and 23B.

Figure 19:
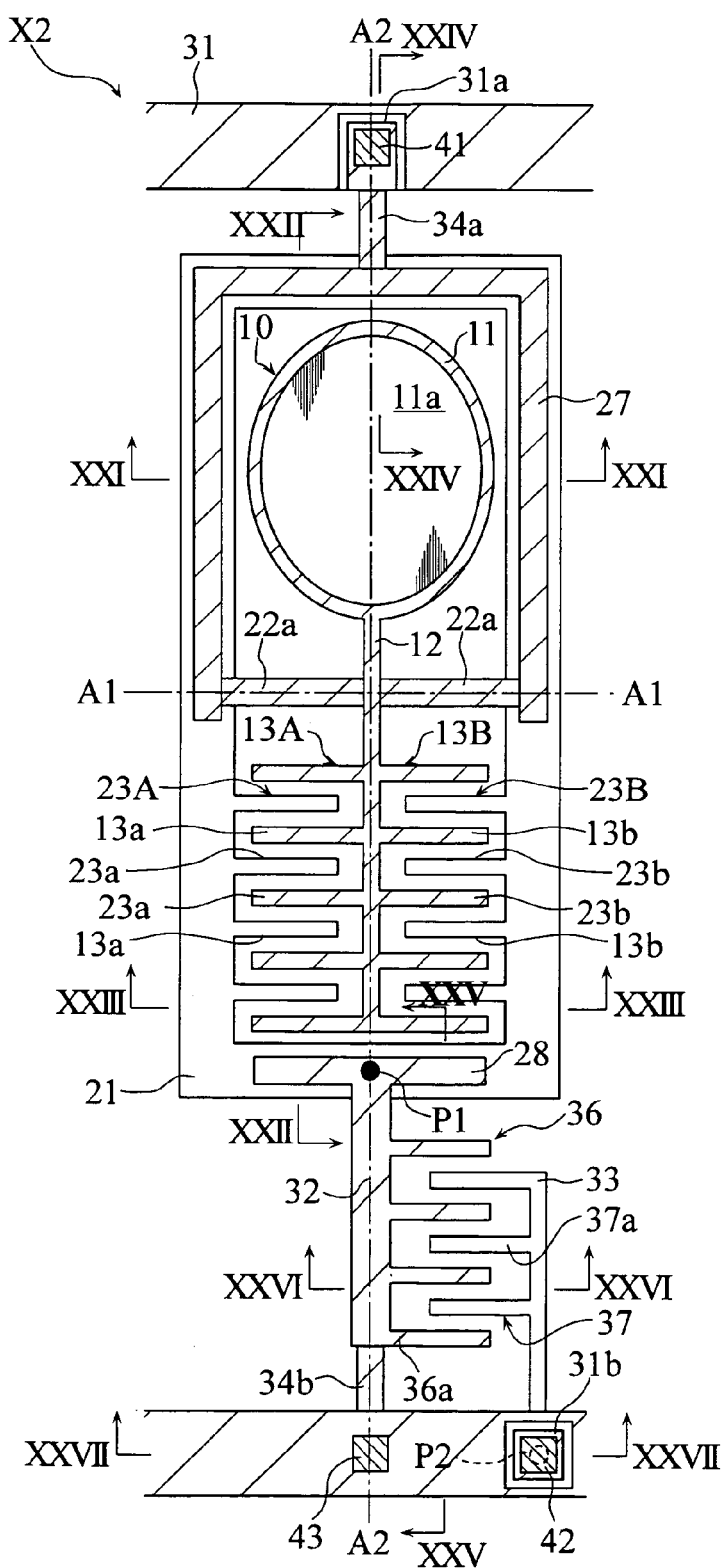
FIG. 19 is a plan view showing a micromirror element according to a second embodiment of the present invention.
Figure 20:
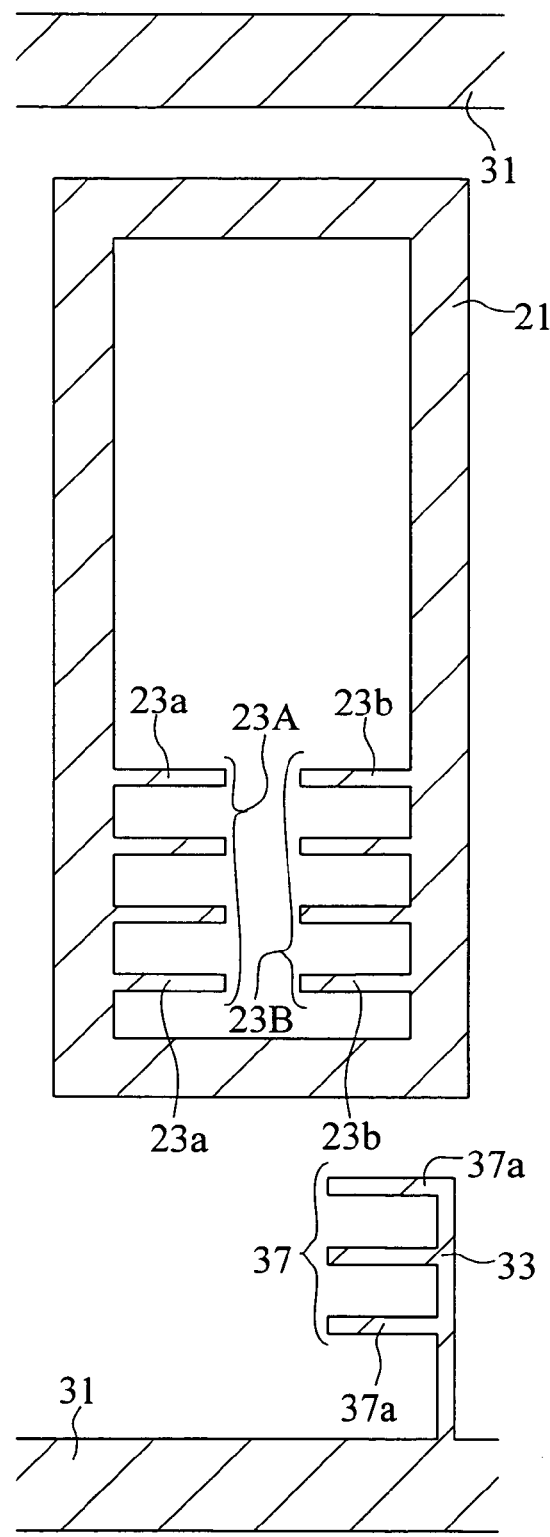
FIG. 20 is a plan view, with partial omission, of the micromirror element shown in FIG. 19.

FIGS. 19 to 27 illustrate a micromirror element X2 of the second embodiment of the present invention. FIG. 19 is a plan view of the micromirror element X2. FIG. 20 is a plan view, with partial omission, of the micromirror element X2. FIGS. 21 to 27 are enlarged views of specific cross sections of the micromirror element X2.

The micromirror element X2 comprises an oscillation section 10, a frame 21, a torsional joining section 22, comb-tooth electrodes 23A, 23B, a wiring section 27, an island section 28, a frame 31 (partially omitted), arm sections 32, 33, a torsional joining section 34, and comb-tooth electrodes 36, 37. Further, the micromirror element X2 is manufactured by conducting machining of a material substrate that is a SOI substrate by using a MEMS technology, as was described hereinabove with reference to the micromirror element X1. The material substrate has a laminated structure composed of the first and second silicon layers and an insulating layer between the silicon layers. The silicon layers are provided with the prescribed electric conductivity by doping with dopants. In order to make the figure clearer, in FIG. 19, the parts derived from the first silicon layer and protruding forward from the paper sheet with respect to the insulating layer are provided with hatching. Further, FIG. 20 shows the structure derived from the second silicon layer in the micromirror element X2.

The oscillation section 10, frame 21, torsional joining section 22, and comb-tooth electrodes 23A, 23B in the micromirror element X2 are identical to the oscillation section 10, frame 21, torsional joining section 22, and comb-tooth electrodes 23A, 23B in the first embodiment.

Figure 21:
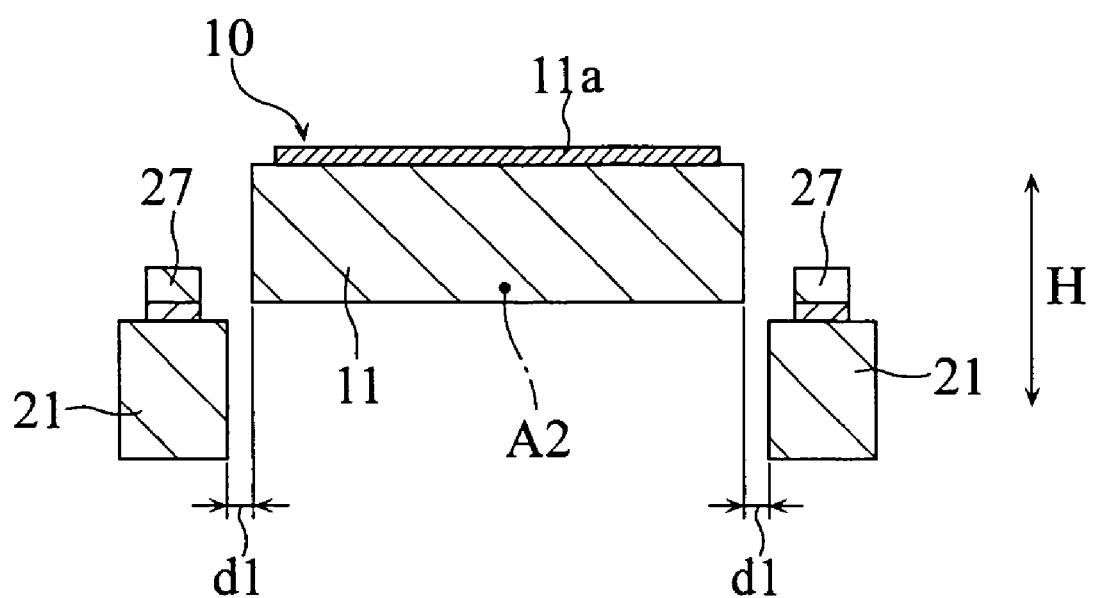
FIG. 21 is a cross-sectional view along the line XXI-XXI in FIG. 19.
Figure 22:
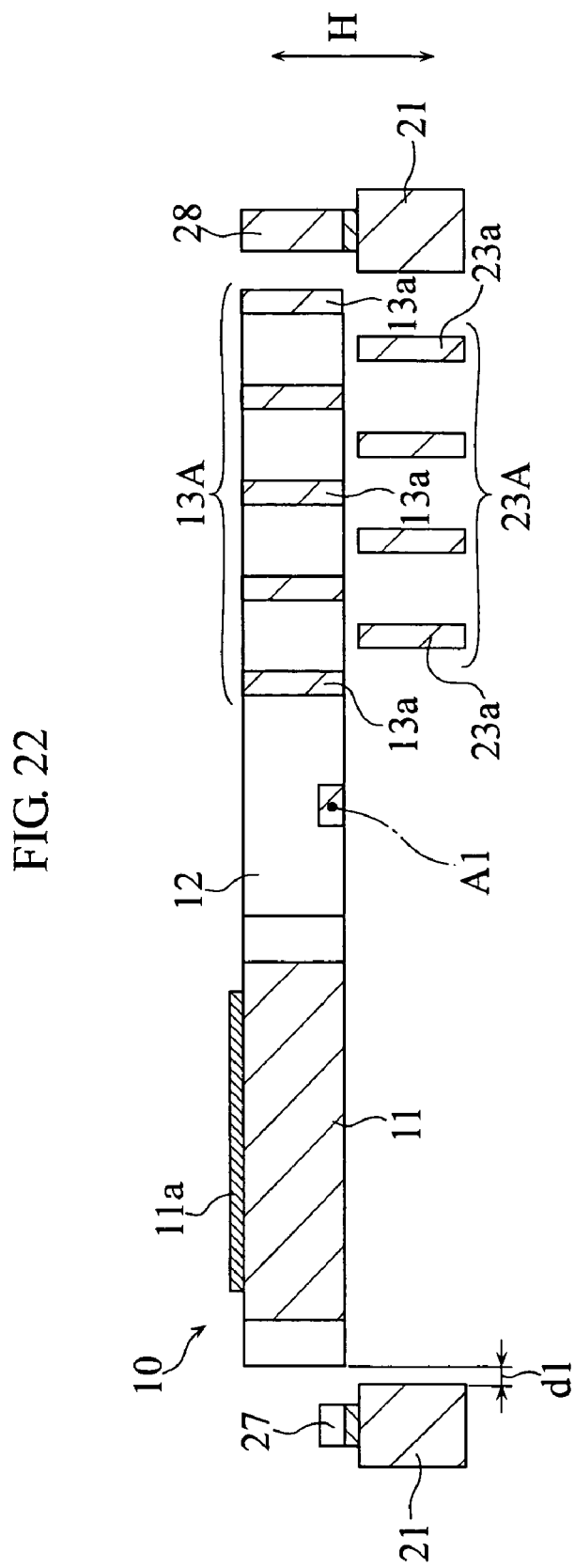
FIG. 22 is a cross-sectional view along the line XXII-XXII in FIG. 19.
Figure 23:
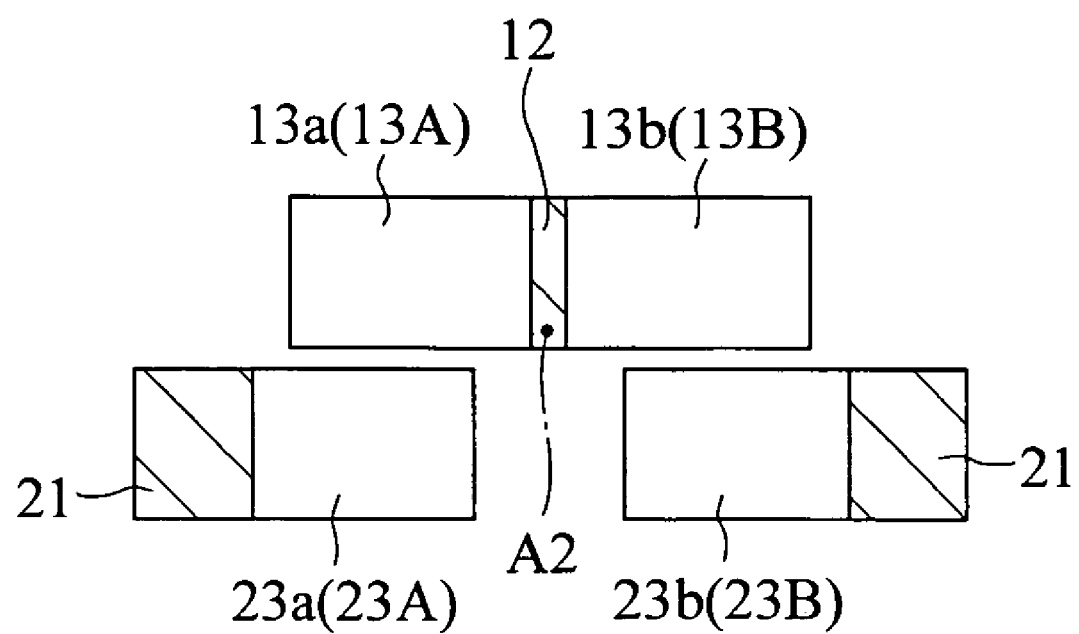
FIG. 23 is a cross-sectional view along the line XXIII-XXIII in FIG. 19.
Figure 24:
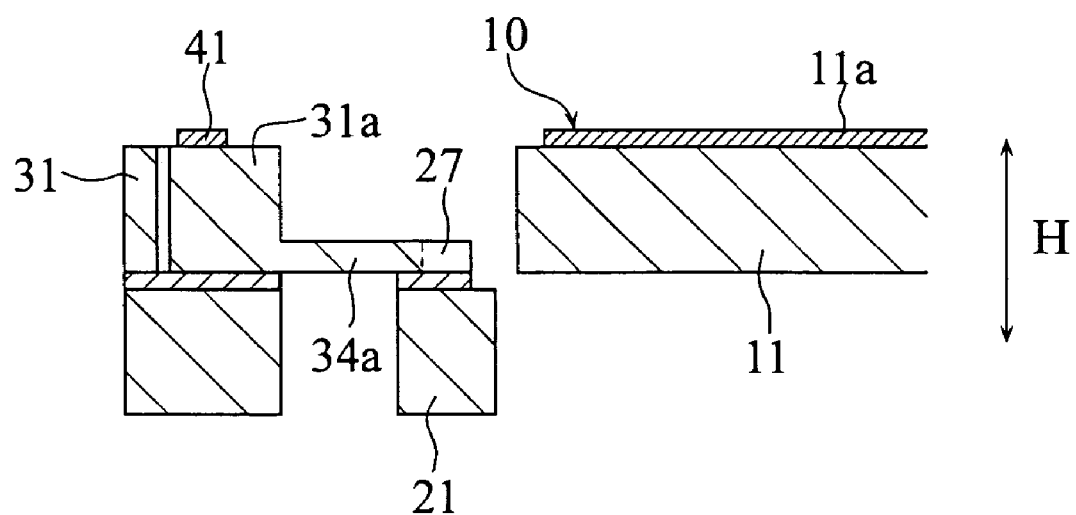
FIG. 24 is a cross-sectional view along the line XXIV-XXIV in FIG. 19.

The wiring section 27 is a part derived from the first silicon layer; it is fixed to the frame 21 via an insulating layer and structurally and electrically connected to the oscillating bar 22a. Further, as shown in FIG. 21, FIG. 22, and FIG. 24, the wiring section 27 is thinner than the oscillation section 10 in the element thickness direction H and, as shown in FIG. 19, FIG. 21, FIG. 22, and FIG. 24, narrower than the frame 21. Such a wiring section 27 is equivalent to the thin narrow structural section of the present invention.

The island section 28 is a part derived from the first silicon layer and fixed to the frame 21 via an insulating layer. Furthermore, it is narrower than the frame 21 and is equivalent to a narrow structural section in accordance with the present invention. The island section 28 is electrically connected to parts of the frame 31 derived from the second silicon layer via an electrically conductive plug P1 passing through the insulating layer.

Figure 27:
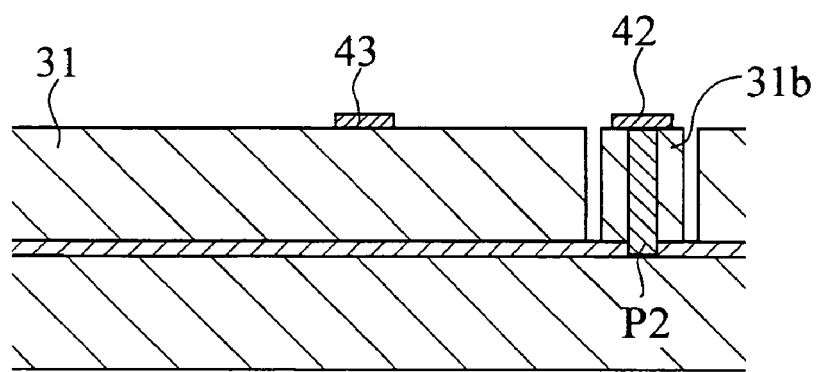
FIG. 27 is a cross-sectional view along the line XXVII-XXVII in FIG. 19.

The frame 31 is a part derived mainly from the first and second silicon layers, has the prescribed mechanical strength and supports the structure located inside the frame 31. The part derived from the second silicon layer in the frame 31 is shown in FIG. 20. Furthermore, as shown in FIG. 19, FIG. 24, and FIG. 27, the frame 31 has island sections 31a, 31b that are structurally and electric separated from the surroundings in the part derived from the first silicon layer. For example, as shown in FIG. 19, electrode pads 41, 42, 43 are provided on the part derived from the first silicon layer of the frame 31. The electrode pad 41 is positioned above the island section 31a, as shown in FIG. 19 and FIG. 24. The electrode pad 42 is positioned above the island section 31b, as shown in FIG. 19 and FIG. 27 and is electrically connected to the part of the frame 31 derived from the second silicon layer via an electrically conductive plug P2 passing through the insulating layer and the island section 31b. The electrode pad 43 is electrically connected to the outside of the island sections 31a, 31b in the part of the frame 31 derived from the first silicon layer.

Figure 25:
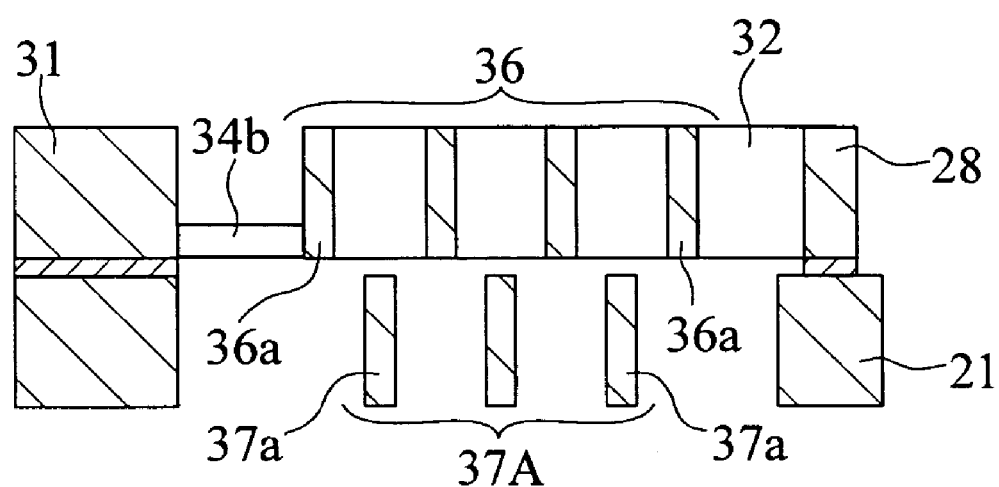
FIG. 25 is a cross-sectional view along the line XXV-XXV in FIG. 19.

The arm section 32 is a part derived mainly from the first silicon layer and extends from the island section 28 in the direction perpendicular to the oscillation axis A1 of the oscillation section 10, as shown in FIG. 19 and FIG. 25. The arm section 33 is a part derived mainly from the second silicon layer and extends from the frame 31 parallel to the arm section 32 in the direction perpendicular to the oscillation axis A1 of the oscillation section 10. Further, as shown in FIG. 20, the arm section 33 is fixed to the part of the frame 31 that is derived from the second silicon layer.

The torsional joining section 34 is composed of a pair of oscillating bars 34a, 34b. The oscillating bar 34a is a part derived mainly from the first silicon layer, and as shown in FIG. 19 and FIG. 24, it is connected to the parts of the frame 21 and frame 31 that are derived from the first silicon layer, and joins them. The oscillating bar 34a is also connected to the wiring section 27 on the frame 21. The oscillating bar 34a and frame 21 are electrically separated by the insulating layer located therebetween. Further, as shown in FIG. 24, the oscillating bar 34a is thinner in the element thickness direction H than the part of the frame 31 that is derived from the first silicon layer. The oscillating bar 34b is a part mainly derived from the first silicon layer, connects the frame 31 and as 32, and joins them, as shown in FIG. 19 and FIG. 25. Such an oscillating bar 34b has a function of electrically connecting the arm section 32 with the part of the frame 31 that is driven from the first silicon layer. Such a torsional joining section 34 (oscillating bars 34a, 34b) defines the oscillation axis A2 of the oscillating action of the frame 21. The extension direction of the oscillation axis A2 is perpendicular to the extension direction of the oscillation axis A1. Such an oscillation axis A2 preferably passes through the center of gravity of the oscillation section 10 or in the vicinity thereof.

Figure 26:
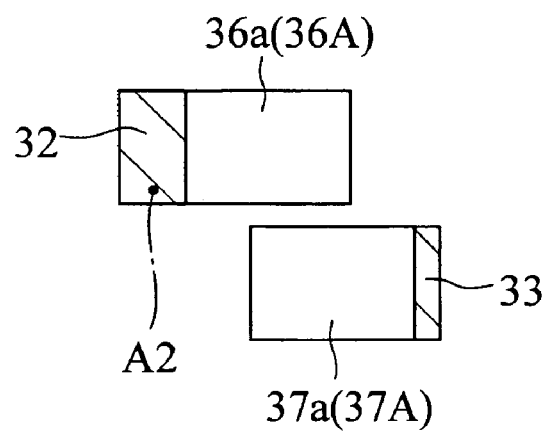
FIG. 26 is a cross-sectional view along the line XXVI-XXVI in FIG. 19.

The comb-tooth electrode 36 is composed of a plurality of electrode teeth 36a. The plurality of electrode teeth 36a extend from the arm section 32 and are separated from each other in the extension direction of the as 32. The electrode teeth 36a are the parts mainly derived from the first silicon layer. The comb-tooth electrode 37 is a part for generating an electrostatic pull-in force in cooperation with the comb-tooth electrode 36 and is composed of a plurality of electrode teeth 37a. The plurality of electrode teeth 37a extend from the arm section 33 and are separated from each other in the extension direction of the arm section 33. The electrode teeth 37a are the parts mainly derived from the second silicon layer. Such comb-tooth electrodes 36, 37 constitute a drive mechanism of the present element. The comb-tooth electrodes 36, 37 are positioned at different heights, as shown in FIG. 25 and FIG. 26, for example, in a non-operative state of the frame 21. Further, the comb-tooth electrodes 36, 37 are disposed so that the electrode teeth 36a, 37a thereof are displaced to prevent mutual contact thereof when the frame 21 oscillates.

FIG. 28 and FIG. 29 illustrate a method for forming the electrically conductive plugs P1, P2 in the micromirror element X2.

Figure 28A:
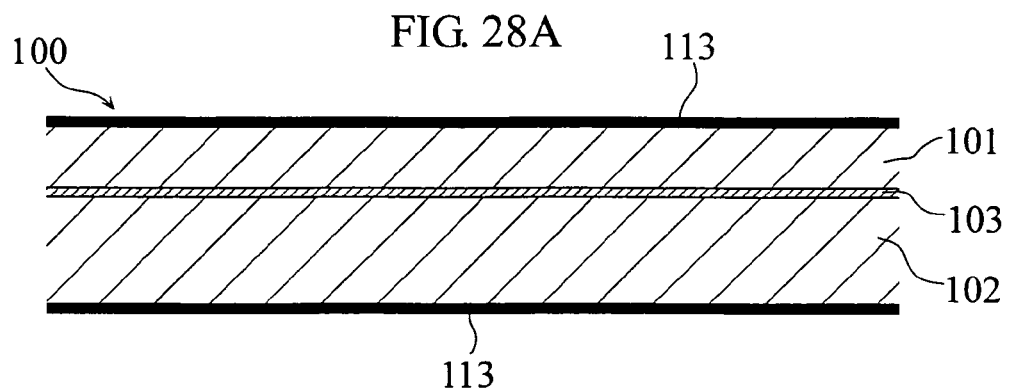
FIGS. 28A-28D illustrate steps of method for forming an electrically conductive plug of the micromirror element shown in FIG. 19.

When the electrically conductive plugs P1, P2 are formed, first, as shown in FIG. 28A, an oxide film 113 is formed on the surfaces of silicon layers 101, 102 of a material substrate 100 similar to that described above with reference to FIG. 7A. The oxide film 113 can be formed by depositing silicon dioxide on the silicon layers 101, 102 by a CVD method. Alternatively, the oxide film 113 can be formed by oxidizing the surface of silicon layers 101, 102 by a thermal oxidation method (heating temperature: for example 900° C.). If necessary, the oxide film 113 may be polished. The thickness of the oxide film 113 is, for example, 0.5-2 mm. In this process, a nitride film may be formed instead of the oxide film 113.

Figure 28B:
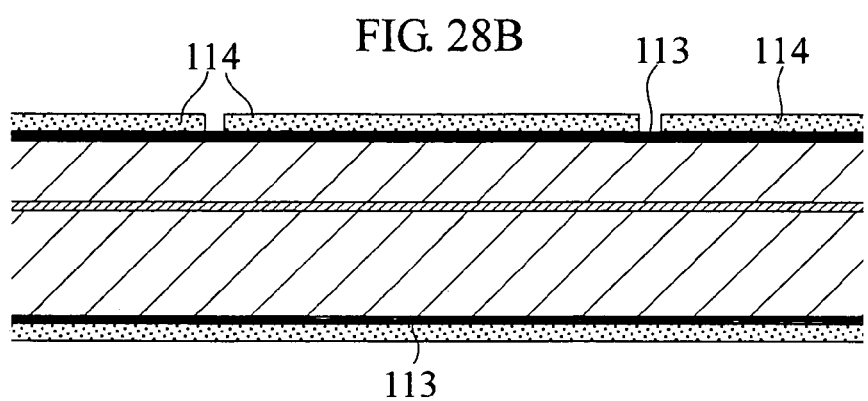

Then, as shown in FIG. 28B, a resist pattern 114 having the prescribed open portion is formed on the oxide films 113. When the resist pattern 114 is formed, first, a liquid photoresist is spin coated on the oxide film 113. Then, the photoresist film is patterned via exposure and subsequent development. For example, AZP4210 (manufactured by Clariant Japan K. K.) or AZ1500 (manufactured by Clariant Japan K. K.) can be used as the photoresist.

Figure 28C:
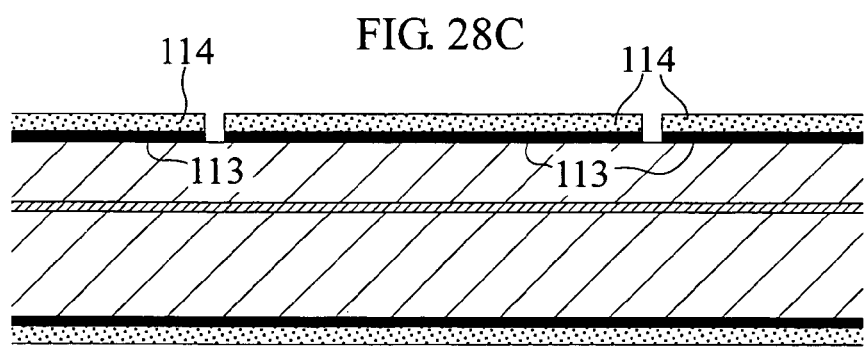

The oxide film 113 is then etched by using the resist pattern 114 as a mask, as shown in FIG. 28C. Dry etching or wet etching can be employed as the etching method. When dry etching is employed, for example, a gas mixture composed of $CHF_3$ and Ar can be employed as the etching gas. When wet etching is employed, for example, a buffer hydrofluoric acid (BHF) composed of hydrofluoric acid and ammonium fluoride can be used as the etching solution. Such dry etching or wet etching can be employed as subsequent etching methods or removal method for the oxide film, oxide film pattern, or insulating layer. The resist pattern 114 is preferably retained, rather than removed, after such patterning of the oxide film 113.

Figure 28D:
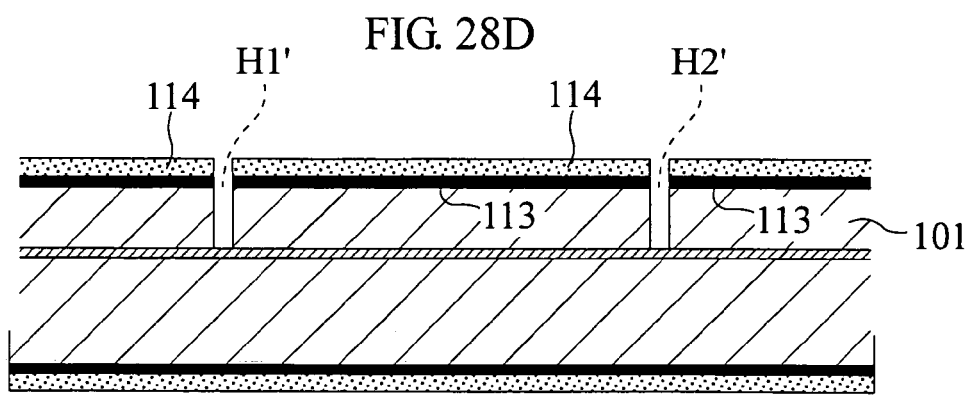

Then, holes H1', H2' passing through the silicon layer 101 are formed as shown in FIG. 28D. When the holes H1', H2' are formed, the silicon layer 101 is etched through to the insulating layer 103 by DRIE by using as a mask the oxide film 113 patterned in the previous step, or the resist pattern in case it was left.

Figure 29A:
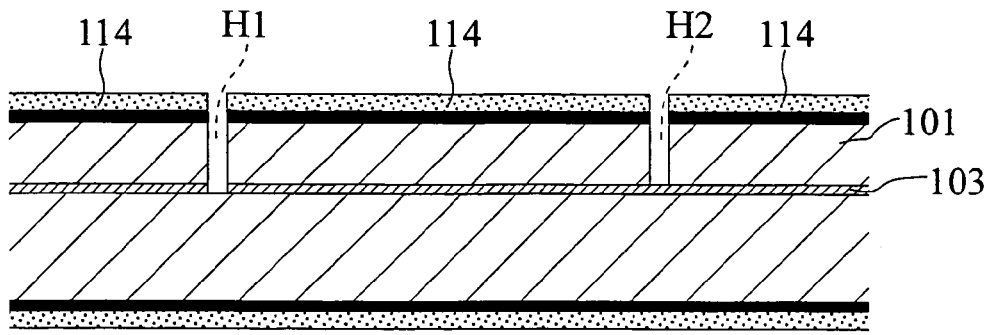
FIGS. 29A-29D show the process implemented after the process illustrated by FIGS. 28A-28D.

Then, as shown in FIG. 29A, holes H1, H2 passing through the silicon layer 101 and also through the insulating layer 103 are formed by etching out the zones of the insulating layer 103 that are exposed in the holes H1', H2'. The resist pattern 114 can be left even after the process explained with reference to FIG. 28C was ended. Such an approach is effective because the resist pattern 114 can also function as the mask in the present process.

Figure 29B:
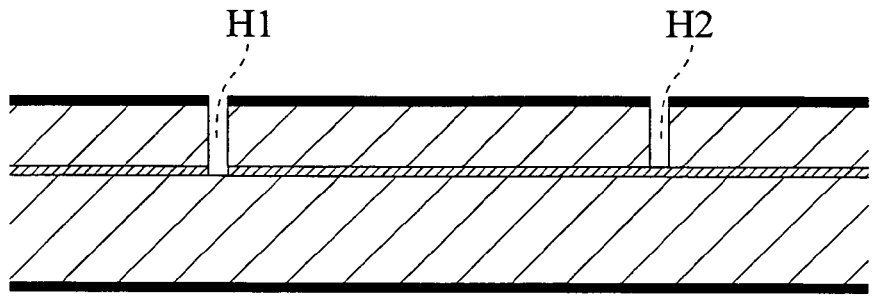

The resist pattern 114 (when a separate resist pattern was used, this separate resist pattern) is removed by treating with a remover, as shown in FIG. 29B. AZ Remover 700 (manufactured by Clariant Japan K. K.) can be used.

Figure 29C:
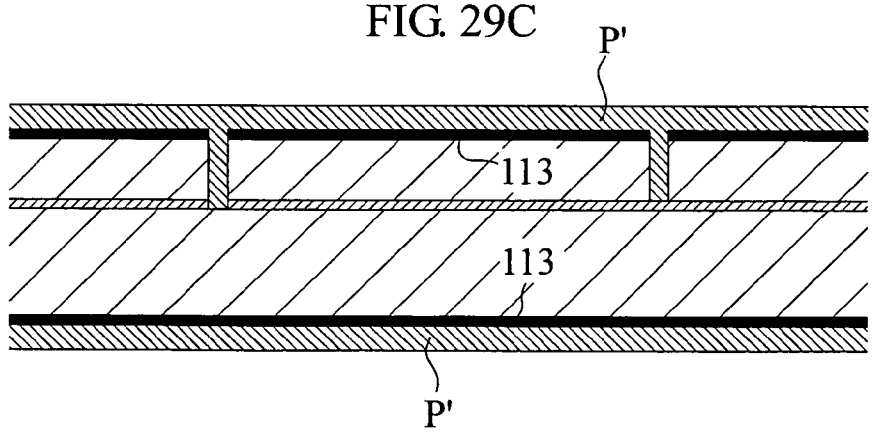

Then, as shown in FIG. 29C, an electrically conductive material P' is deposited inside the holes H1, H2, for example by a CVD method. At this time, the sufficient quantity of the electrically conductive material P' is supplied into the holes H1, H2 to provide for deposition even on the oxide film 113. Polysilicon doped with the prescribed dopant or a metal such as Cu or W can be employed as the electrically conductive material P'. From the standpoint of ensuring good electric contact of the electrically conductive material P' and silicon layers 101, 102, it is preferred that the natural oxide film present on the surface of the holes H1, H2 may be removed by treating with e.g. hydrofluoric acid immediately prior to depositing the electrically conductive material P'.

Figure 29D:
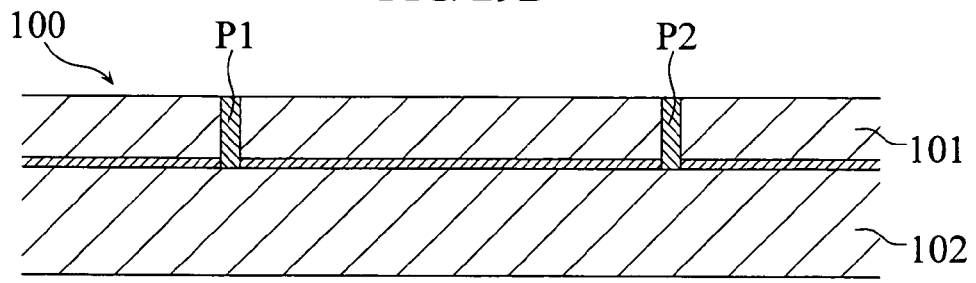

Then, as shown in FIG. 29D, the surface of the silicon layers 101, 102 is exposed. More specifically, the electrically conductive material P' outside the holes H1, H2 is etched out by the prescribed dry etching or wet etching, and the oxide film 113 is then etched out. When wet etching is employed as the method for removing the electrically conductive material P', an aqueous solution of KOH or BHF can be used as the etchant. In the present process, a method for removing the oxide film 113 and the electrically conductive material P' outside the holes H1, H2 by polishing by the CMP method may be employed instead of the above-described method. In the present process, the electrically conductive plugs P1, P2 are formed as the remaining material. In the state shown in FIG. 29D, those electrically conductive plugs P1, P2 electrically connect the silicon layer 101 and silicon layer 102.

The electrically conductive plugs P1, P2 embedded in the material substrate 100 can be formed in the above-described manner. The micromirror element X2 can be manufactured by conducting processing of the material substrate 100, which has the electrically conductive plugs P1, P2 embedded therein, by using the MEMS technology in the same manner as explained hereinabove with reference to the micromirror element X1.

In the micromirror element X2, the oscillation section 10 through the mirror support section 11 can be driven to oscillate around the oscillation axis A1 by applying, if necessary, the prescribed electric potential to the comb-tooth electrodes 13A, 13B, 23A, 23B, 36, 37, and the frame 21 together with the oscillation section 10 following it can be driven to oscillate around the oscillation axis A2. Thus, the micromirror element X2 is the so-called twin-axis oscillation element.

The application of electric potential to the comb-tooth electrodes 13A, 13B can be realized via the electrode pad 41, island section 31a of the frame 31, oscillating bar 34a, wiring section 27, both oscillating bars 22a, and arm section 12. The application of electric potential to the comb-tooth electrode 36 can be realized via the electrode pad 43, part of the frame 31 that is derived from the first silicon layer and is electrically connected to the electrode pad 43, oscillating bar 34b, and arm section 32. The application of electric potential to the comb-tooth electrodes 23A, 23B can be realized via the electrode pad 43, part of the frame 31 that is derived from the first silicon layer and electrically connected to the electrode pad 43, oscillating bar 34b, arm section 32, island section 28, electrically conductive plug P1, and frame 21. The application of electric potential to the comb-tooth electrode 37 can be realized via the electrode pad 42, electrically conductive plug P2, part of the frame 31 that is derived from the second silicon layer, and arm section 33. The quantity of rotary displacement in the oscillating action around the oscillation axis A1 can be adjusted by adjusting the electric potential applied to the comb-tooth electrodes 13A, 13B, 23A, 23B. Furthermore, the quantity of rotary displacement during the oscillating action around the oscillation axis A2 can be adjusted by adjusting the electric potential applied to the comb-tooth electrodes 36, 37. Such oscillating drive of the oscillation section 10 through mirror support section 11 and the oscillating drive of the frame 21 and oscillation section 10 following it makes it possible to switch appropriately the reflection direction of the light reflected by the mirror surface 11a provided on the mirror support section 11.

In the micromirror element X2, similarly to the micromirror element X1, the mirror support section 11 and frame 21 are the parts formed by different etching processes in mutually different conductive layer. Therefore, when the mirror support section 11 or frame 21 is formed, it is not necessary to form a gap having the aspect ratio below the prescribed level (that is, a gap having a length above the prescribed level in the in-plane direction of the material substrate) between the mirror support section 11 and frame 21. In the micromirror element X2, the separation distance d1 (shown in FIG. 21 and FIG. 22) of the mirror support section 11 and frame 21 in the in-plane direction of the material substrate may be a minimum length necessary to avoid the contact of the mirror support section 11 with the frame 21 during the oscillating action of the oscillation section 10. Therefore, the micromirror element X2 is suitable for miniaturization.

Moreover, the micromirror element X2, similarly to the above-described micromirror element X1, is adapted for miniaturization by setting small design dimensions of the mirror support section 11 in the direction of the oscillation axis A1, that is, small design dimensions of the entire element, while ensuring the drive force for the oscillating action of the oscillation section 10 by providing the desired number of the electrode teeth 13a, 13b, 23a, 23b, 36a, 37a, regardless of the design dimensions of the mirror support section 11 in the direction of oscillation axis A1.

Figure 30:
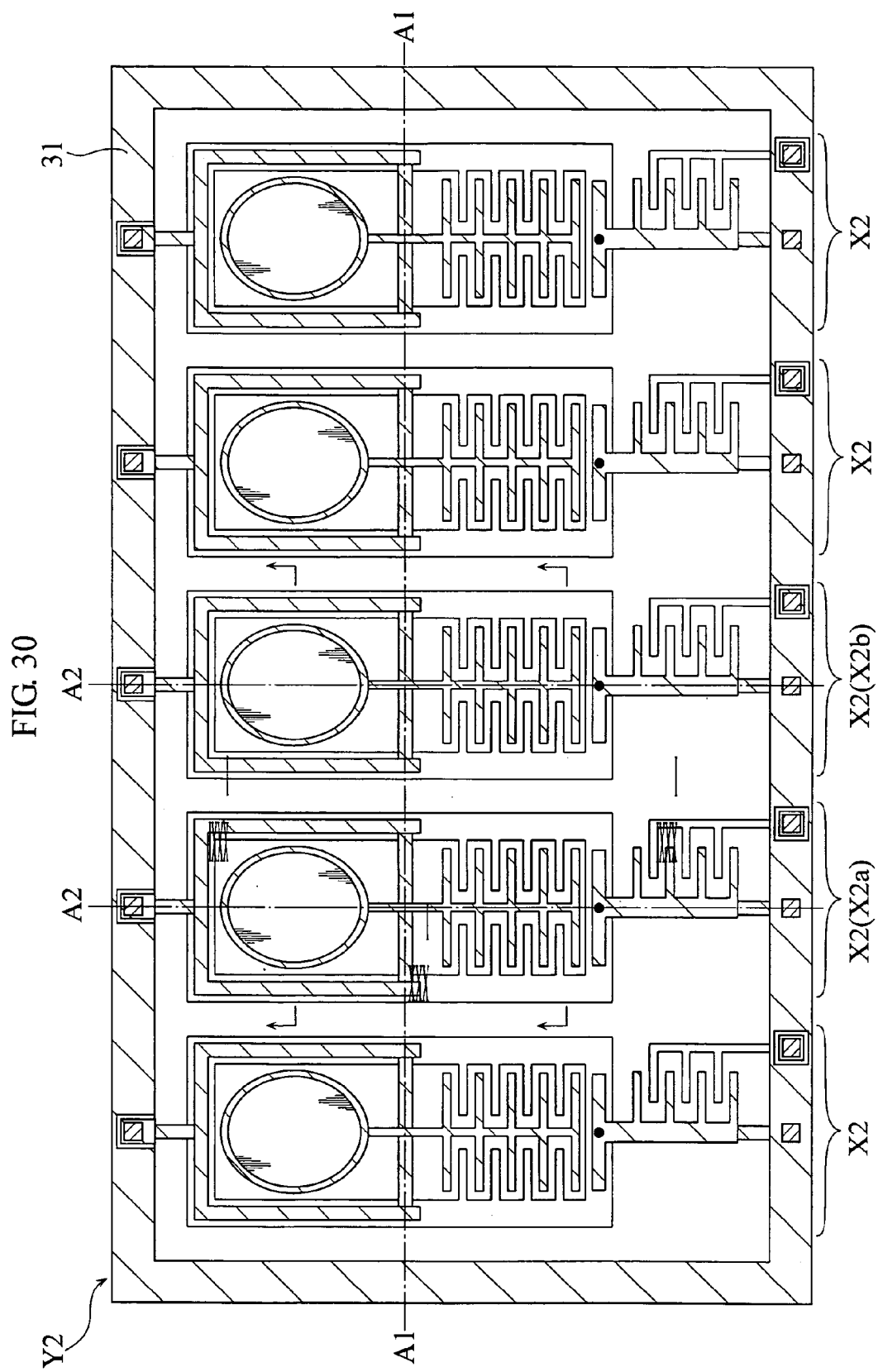
FIG. 30 shows a micromirror array comprising a plurality of micromirror elements shown in FIG. 19.
Figure 31:
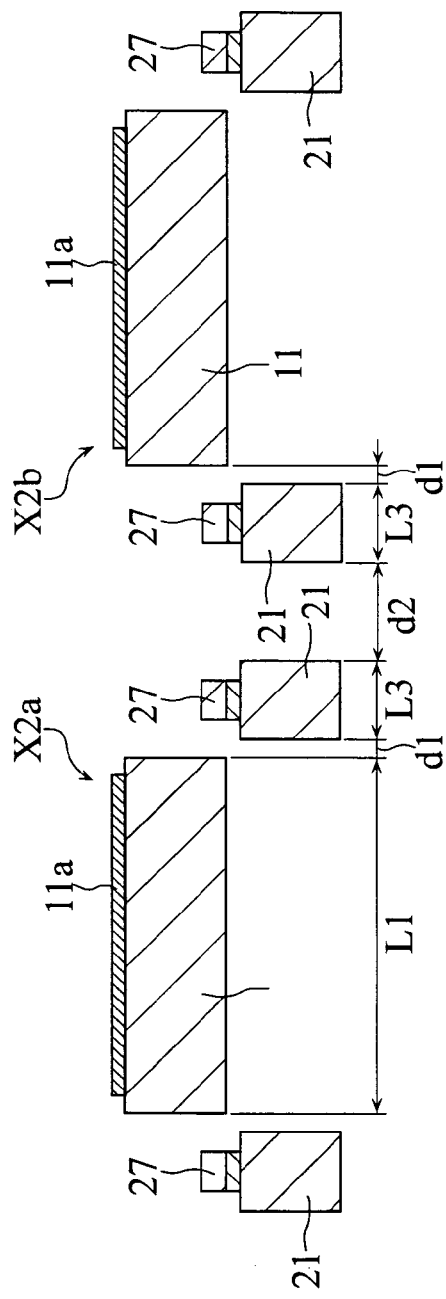
FIG. 31 is a cross-sectional view along the line XXXI-XXXI in FIG. 30.
Figure 32:
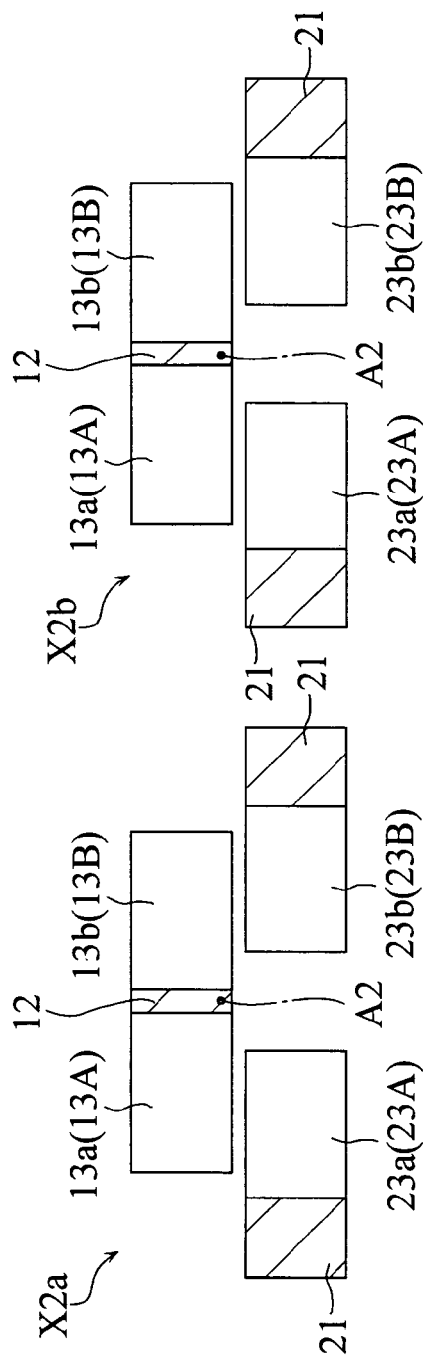
FIG. 32 is a cross-sectional view along the line XXXII-XXXII in FIG. 30.

FIG. 30 shows a micromirror array Y2 comprising a plurality of micromirror elements X2. In order to make the figure clearer, in FIG. 30, some of the parts are represented by hatching. Further, FIGS. 31 and 32 are enlarged cross-sectional view along the lines XXXI-XXXI and XXXII-XXXII, respectively, in FIG. 30, those views relating to micromirror elements X2a, X2b contained in the micromirror array Y2. In the micromirror array Y2, a plurality of micromirror elements X2 are arranged in a row in the direction of the oscillation axis A1. Therefore, in the micromirror array Y2, a plurality of mirror surfaces 11a are arranged in a row in the direction of the oscillation axis A1. The arrangement pitch of a plurality of mirror surfaces 11a is represented by L1+2L3+2d1+d2, where d2 stands for a separation distance between the frames 21 of two adjacent micromirror elements X2.

As described hereinabove, the separation distance d1 of the mirror support section 11 and frame 21 in the in-plane direction of the material substrate may be a minimum length necessary to avoid the contact of the mirror support section 11 with the frame 21 during the oscillating action of the oscillation section 10. In addition, the micromirror element X2 has a drive mechanism (comb-tooth electrodes 13A, 13B, 23A, 23B, 36, 37) of a structure adapted for shortening in the direction of the oscillation axis A1. Therefore, in the micromirror array Y2, a short arrangement pitch can be realized for a plurality of mirror surfaces 11a. Thus, in the micromirror array Y2, a plurality of mirror surfaces 11a can be arranged with a high density in the direction of the oscillation axis A1.

Further, in the micromirror array Y2, the drive of the oscillation section 10 of each micromirror element X2 around the oscillation axis A1 can be conducted by applying the prescribed electric potential to the comb-tooth electrodes 13A, 13B in a state where the comb-tooth electrodes 23A, 23B are connected to the ground. Therefore, in the micromirror array Y2, the electric interference between the adjacent micromirror elements X2 can be inhibited.

When the oscillation section 10 of the micromirror element X2b is driven around the oscillation axis A1, without driving the oscillation section 10 of the micromirror element X2a around the oscillation axis A1, if the prescribed electric potential is applied to the comb-tooth electrodes 23A, 23B of the micromirror element X2b and no electric potential is applied to the comb-tooth electrodes 23A, 23B of the micromirror element X2a in a state where the comb-tooth electrodes 13A, 13B of the micromirror elements X2a, X2b are connected to the ground, then the difference in potentials and, therefore, an electrostatic pull-in force is generated between the frame 21 (to which the prescribed electric potential has been applied) of the micromirror element X2b and the frame 21 (the electric potential is 0 V) of the micromirror element X2a. For this reason, if the two frames 21 of the micromirror elements X2a, X2b become too close to each other, a significant electrostatic pull-in force acts upon the two frames 21 and the two frames are rotary displaced around the oscillation axis A2. A driving method by which an electrostatic pull-in force can be generated between the frames 21 positioned on the outermost side of the micromirror elements X2a, X2b in the cross-sections shown in FIG. 31 and FIG. 32 is undesirable from the standpoint of shortening the distance between the micromirror elements X2 in the direction of the oscillation axis A1 and increasing the density of the mirror surface 11a.

By contrast, when the oscillation section 10 of the micromirror element X2b is driven around the oscillation axis A1, without driving the oscillation section 10 of the micromirror element X2a around the oscillation axis A1, if the prescribed electric potential is applied to the comb-tooth electrodes 13A, 13B of the micromirror element X2b, and no electric potential is applied to the comb-tooth electrodes 13A, 13B of the micromirror element X2b in a state where the comb-tooth electrodes 23A, 23B of the micromirror elements X2a, X2b are connected to the ground, then the difference in potentials and, therefore, an electrostatic pull-in force is generated between the two frames 21 of the micromirror elements X2a, X2b. The difference in potentials is generated between the wiring section 27 and oscillation section 10 of the micromirror element X2a and between the wiring section 27 and oscillation section 10 of the micromirror element X2b. However, the separation distances thereof are larger than the separation distance of the adjacent frames 21. At the same time, the surface area over which the adjacent wiring sections 27 face each other is smaller than the surface area over which the adjacent frames 21 face each other. Therefore, a significant electrostatic pull-in force is hardly generated between the wiring section 27 and oscillation section 10 of the micromirror element X2a and between the wiring section 27 and oscillation section 10 of the micromirror element X2b. Thus, in the micromirror Y2, electric interference between the adjacent micromirror elements X2 can be inhibited. In such micromirror array Y2, a plurality of mirror surfaces 11a can be disposed with a high density in the direction of the oscillation axis A1.

Figure 33:
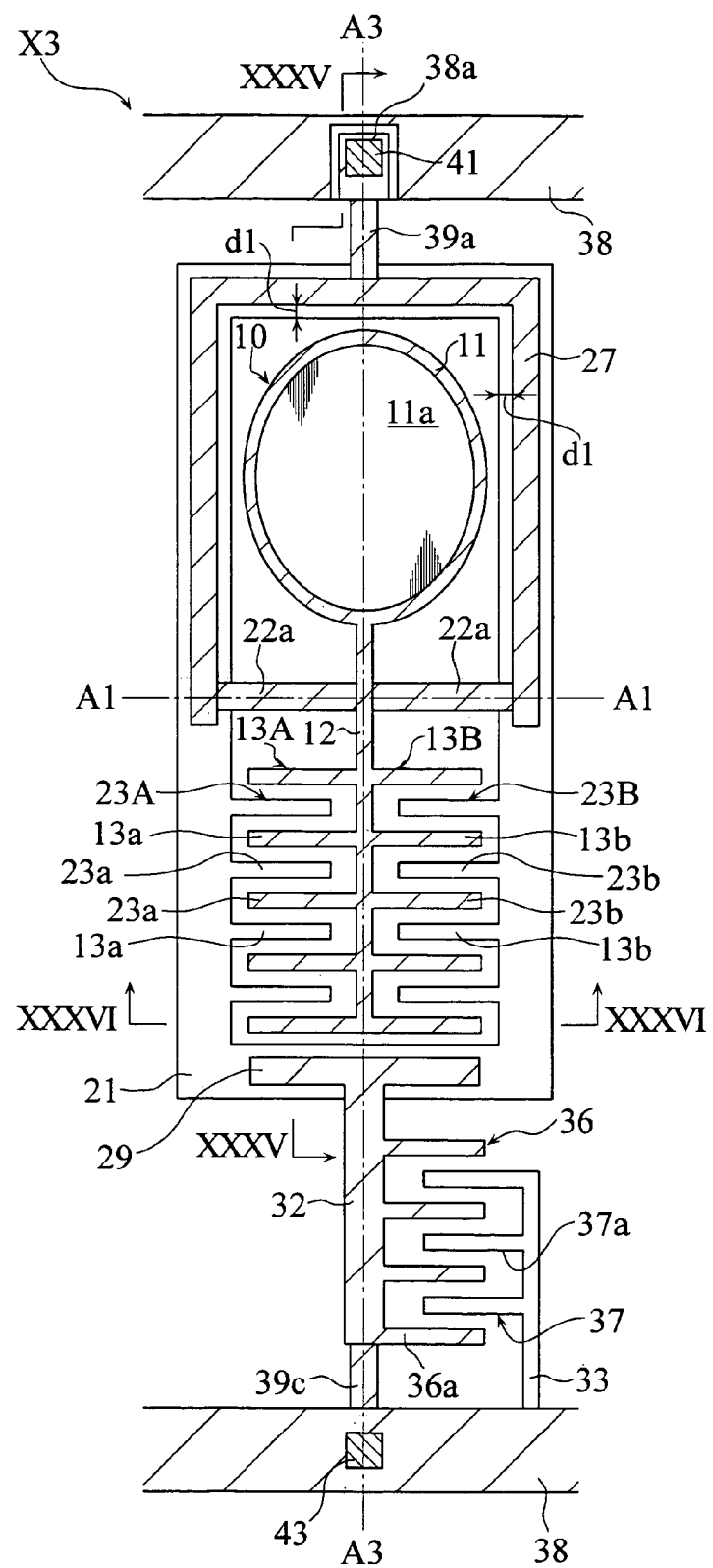
FIG. 33 is a plan view showing a micromirror element according to a third embodiment of the present invention.
Figure 34:
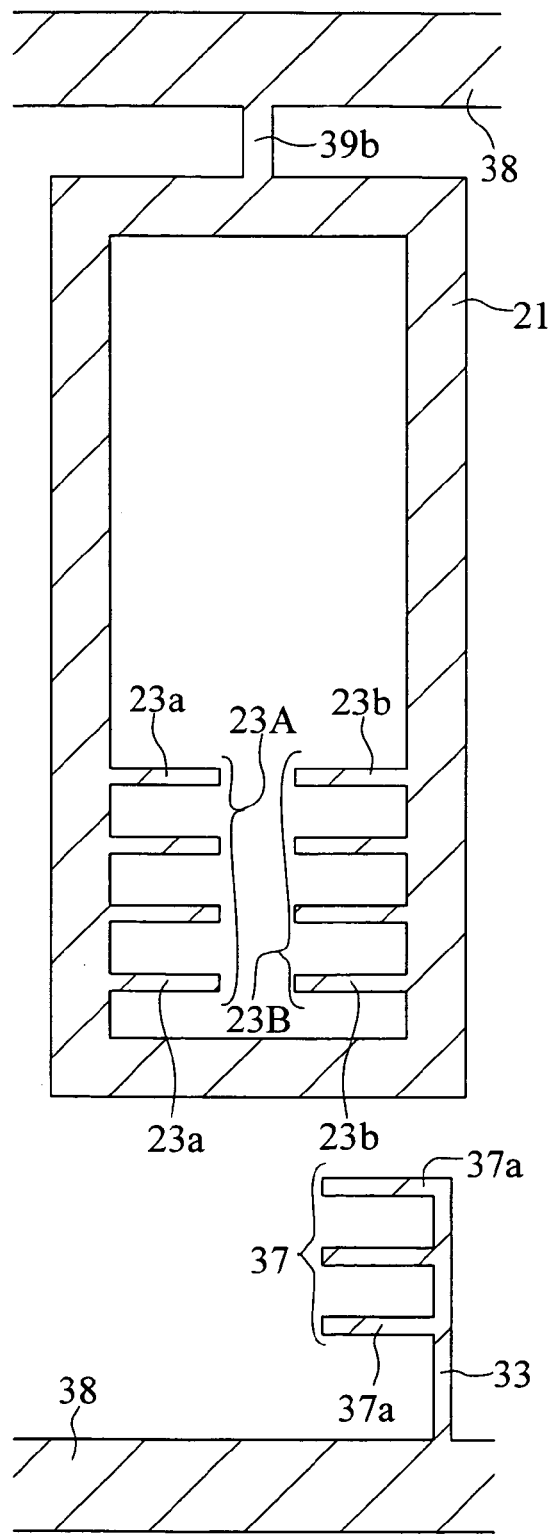
FIG. 34 is a plan view, with partial omission, of the micromirror element shown in FIG. 33.
Figure 35:
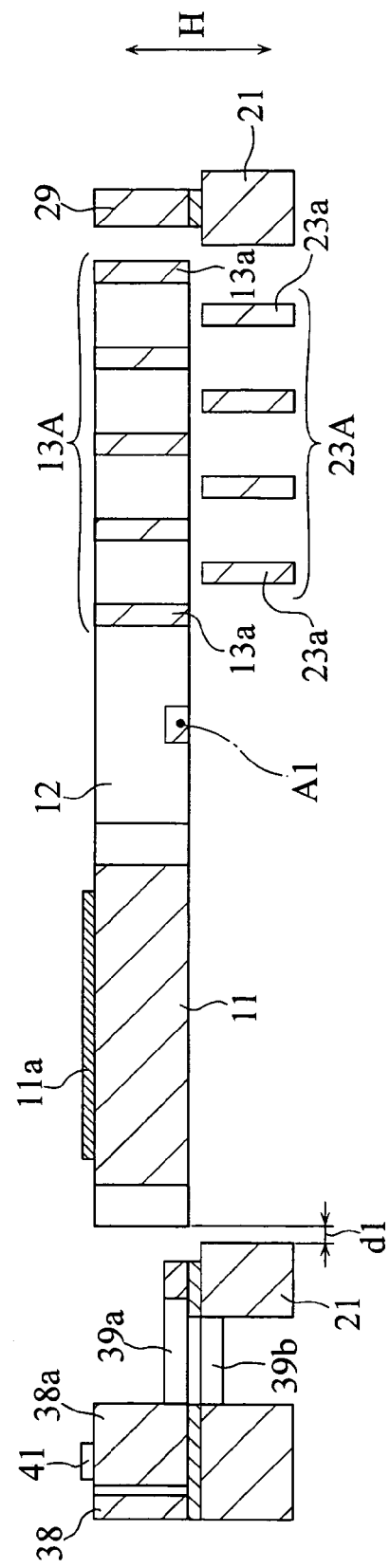
FIG. 35 is a cross-sectional view along the line XXXV-XXXV in FIG. 33.
Figure 36:
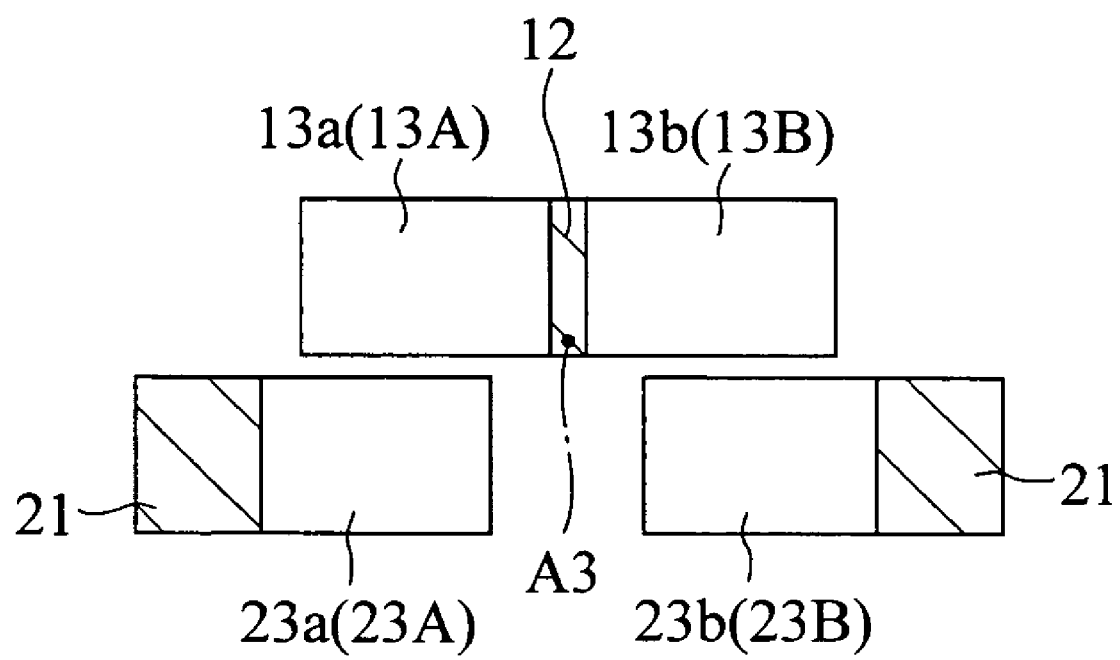
FIG. 36 is a cross-sectional view along the line XXXVI-XXXVI in FIG. 33.

FIGS. 33 to 36 illustrates a micromirror element X3 of the third embodiment of the present invention. FIG. 33 is a plan view of the micromirror element X3. FIG. 34 is a plan view, with partial omission, of the micromirror element X3. FIGS. 35 and 36 are cross-sectional views along the line XXXV-XXXV and line XXXVI-XXXVI, respectively, of the micromirror element X3.

The micromirror element X3 comprises an oscillation section 10, a frame 21, a torsional joining section 22, comb-tooth electrodes 23A, 23B, a wiring section 27, an island section 29, a frame 38 (partially omitted), arm sections 32, 33, a torsional joining section 39, and comb-tooth electrodes 36, 37. Further, the micromirror element X3 is manufactured by conducting machining of a material substrate that is a SOI substrate by using a MEMS technology, as is described hereinabove with reference to the micromirror element X1. The material substrate has a laminated structure composed of the first and second silicon layers and an insulating layer between the silicon layers. The silicon layers are provided with the prescribed electric conductivity by doping with dopants. In order to make the figure clearer, in FIG. 33, the parts derived from the first silicon layer and protruding forward from the paper sheet with respect to the insulating layer are provided with hatching. Further, FIG. 34 shows the structure derived from the second silicon layer in the micromirror element X3.

The oscillation section 10, frame 21, torsional joining section 22, and comb-tooth electrodes 23A, 23B in the micromirror element X3 are identical to the oscillation section 10, frame 21, torsional joining section 22, and comb-tooth electrodes 23A, 23B in the first embodiment. Further, the arm section 32 and comb-tooth electrodes 36, 37 in micromirror element X3 are identical to the arm section 32 and comb-tooth electrodes 36, 37 in the second embodiment.

The island section 29 is a part derived from the first silicon layer and fixed to the frame 21 via an insulating layer. Further, the island section 29 is narrower than the frame 21 and is equivalent to the narrow structural section in accordance with the present invention.

The frame 38 is a part derived mainly from the first and second silicon layers, has the prescribed mechanical strength and supports the structure located inside the frame 38. The part derived from the second silicon layer in the frame 38 is shown in FIG. 34. Furthermore, as shown in FIG. 33 and FIG. 35, the frame 38 has an island section 38a that is structurally and electric separated from the surroundings in the part derived from the first silicon layer. For example, as shown in FIG. 33, electrode pads 41, 43 are provided on the part of the frame 38 that is derived from the first silicon layer. The electrode pad 41 is positioned above the island section 38a, as shown in FIG. 33 and FIG. 35. The electrode pad 43 is electrically connected to the outside of the island section 38a in the part of the frame 38 that is derived from the first silicon layer.

The arm section 33 is a part derived mainly from the first silicon layer and extends from the frame 38 parallel to the arm section 32, that is, in the direction perpendicular to the oscillation axis A1 of the oscillation section 10. Further, as shown in FIG. 34, the arm section 33 is fixed to the part of the frame 38 that is derived from the second silicon layer.

The torsional joining section 39 is composed of a set of oscillating bars 39a, 39b and an oscillating bar 39c.

The oscillating bar 39a is a part derived mainly from the first silicon layer and, as shown in FIG. 33 and FIG. 35, connected to the parts of the frame 21 and frame 31 that are derived from the first silicon layer and joins them. The oscillating bar 39a is also connected to the wiring section 27 on the frame 21. The oscillating bar 39a and frame 21 are electrically separated by the insulating layer introduced therebetween. Such an oscillating bar 39a is thinner in the element thickness direction H than the part of the frame 31 that is derived from the second silicon layer, as shown in FIG. 35.

The oscillating bar 39b is a part derived mainly from the second silicon layer and, as shown in FIG. 34 and FIG. 35, connected to the parts of the frame 21 and frame 38 that are derived from the second silicon layer, joining them. The oscillating bar 39b has a function of electrically connecting the frame 21 with the part of the frame 38 that is derived from the second silicon layer. The zone where the oscillating bar 39b is fixed and the zone where the above-described arm section 33 is fixed in the part of the frame 38 that is derived from the second silicon layer are electrically separated. Further, the oscillating bar 39b is thinner in the element thickness direction H than the parts of the frame 21 and frame 38 that are derived from the first silicon layer, as shown in FIG. 35.

The oscillating bar 39c is a part derived mainly from the first silicon layer and, as shown in FIG. 33, connected to the arm section 32 and the part of the frame 38 that is derived from the first silicon layer. The oscillating bar 39c has a function of electrically connecting the arm section 32 with the part of the frame 31 that is derived from the first silicon layer. Further, the oscillating bar 39c is thinner in the element thickness direction H than the arm 32 and the part of the frame 31 that is derived from the first silicon layer.

Such an oscillating bar 39 (oscillating bars 39a, 39b, 39c) defines an oscillation axis A3 for the oscillating action of the frame 21. The extension direction of the oscillation axis A3 is perpendicular to the extension direction of the oscillation axis A1. Such an oscillation axis A3 preferably passes through the center of gravity of the oscillation section 10 or in the vicinity thereof.

In the micromirror element X3, the oscillation section 10 through mirror support section 11 can be driven to oscillate around the oscillation axis A1, if necessary, by applying the prescribed electric potential to comb-tooth electrodes 13A, 13B, 23A, 23B, 36 and 37, and the frame 21 and the oscillation section 10 following it can be driven to oscillate around the oscillation axis A3.

The application of electric potential to the comb-tooth electrodes 13A, 13B can be realized via the electrode pad 41, island section 38a of the frame 38, oscillating bar 39a, wiring section 27, both oscillating bars 22a, and arm section 12. The application of electric potential to the comb-tooth electrode 36 can be realized via the electrode pad 43, part of the frame 38 that is derived from the first silicon layer and electrically connected to the electrode pad 43, oscillating bar 39c, and arm section 32. The application of electric potential to the comb-tooth electrodes 23A, 23B can be realized via the part of the frame 38 that is derived from the second silicon layer, oscillating bar 39b, and frame 21. The application of electric potential to the comb-tooth electrode 37 can be realized via the part of the frame 38 that is derived from the second silicon layer and the arm section 33. As described hereinabove, the zone where the oscillating bar 39b is fixed and the zone where the above-described arm section 33 is fixed in the part of the frame 38 that is derived from the second silicon layer are electrically separated. The quantity of rotary displacement in the oscillating action around the oscillation axis A1 can be adjusted by adjusting the electric potential applied to the comb-tooth electrodes 13A, 13B, 23A, 23B. Furthermore, the quantity of rotary displacement in the oscillating action around the oscillation axis A3 can be adjusted by adjusting the electric potential applied to the comb-tooth electrodes 36, 37. Such oscillating drive of the oscillation section 10 through mirror support section 11 and the oscillating drive of the frame 21 and oscillation section 10 following it makes it possible to switch appropriately the reflection direction of the light reflected by the mirror surface 11a provided on the mirror support section 11.

In the micromirror element X3, similarly to the micromirror element X1, the mirror support section 11 and frame 21 are the parts formed by different etching processes in mutually different conductive layer. Therefore, when the mirror support section 11 or frame 21 is formed, it is not necessary to form a gap having the aspect ratio below the prescribed level (that is, a gap having a length above the prescribed level in the in-plane direction of the material substrate) between the mirror support section 11 and frame 21. In the micromirror element X3, the separation distance d1 (shown in FIG. 33 and FIG. 35) of the mirror support section 11 and frame 21 in the in-plane direction of the material substrate may be a minimum length necessary to avoid the contact of the mirror support section 11 with the frame 21 during oscillating action of the oscillation section 10. Therefore, the micromirror element X3 is adapted for miniaturization.

Further, similarly to the micromirror element X1 described above, the micromirror element X3 is adapted for miniaturization by setting small design dimensions of the mirror support section 11 in the direction of the oscillation axis A1, that is, small design dimensions of the entire element, while ensuring the drive force for the oscillating action of the oscillation section 10 by providing the desired number of the electrode teeth 13a, 13b, 23a, 23b, 36a, 37a, regardless of the design dimensions of the mirror support section 11 in the direction of oscillation axis A1.

Figure 37:
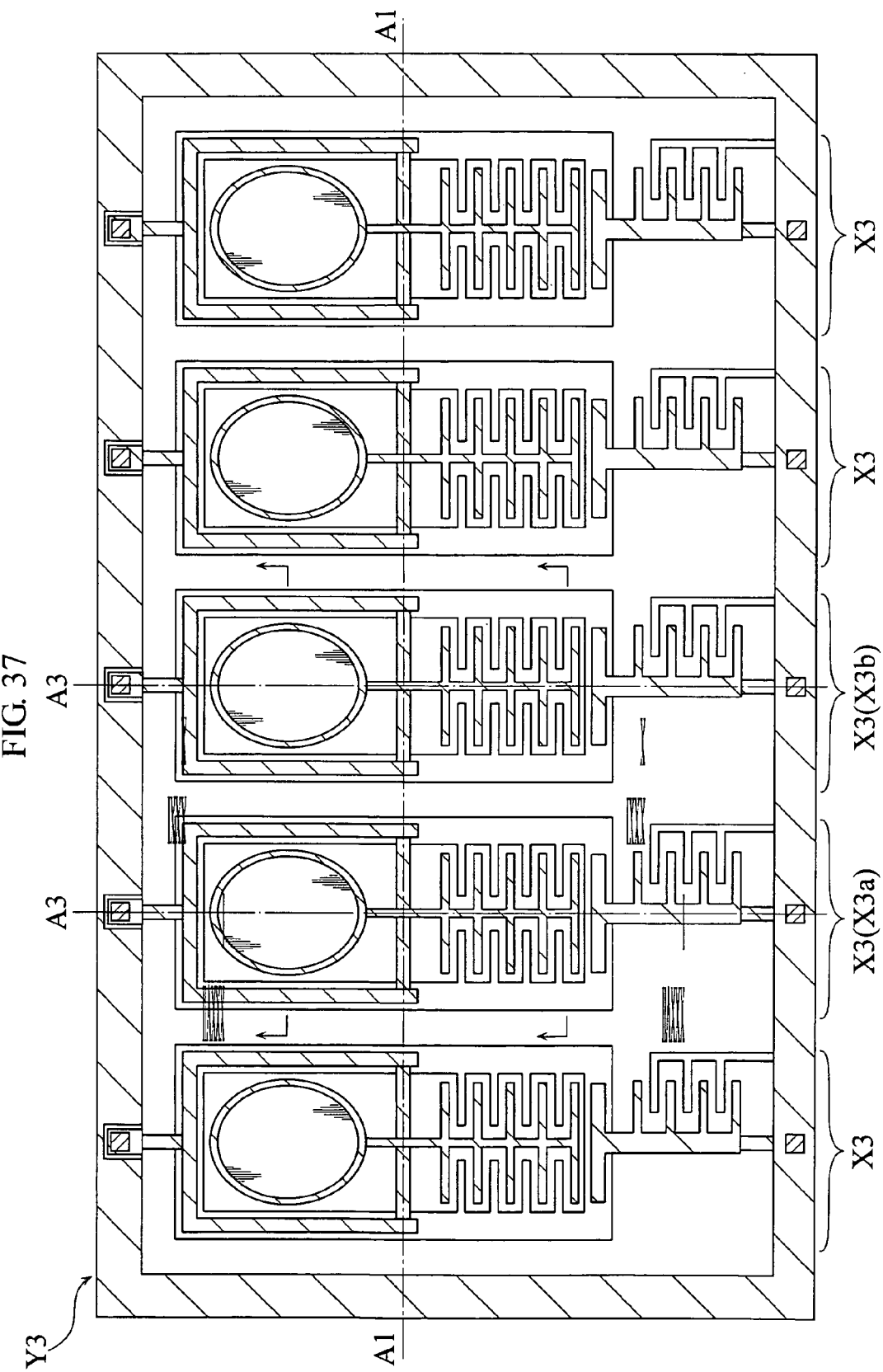
FIG. 37 shows a micromirror array comprising a plurality of micromirror elements shown in FIG. 33.
Figure 38:
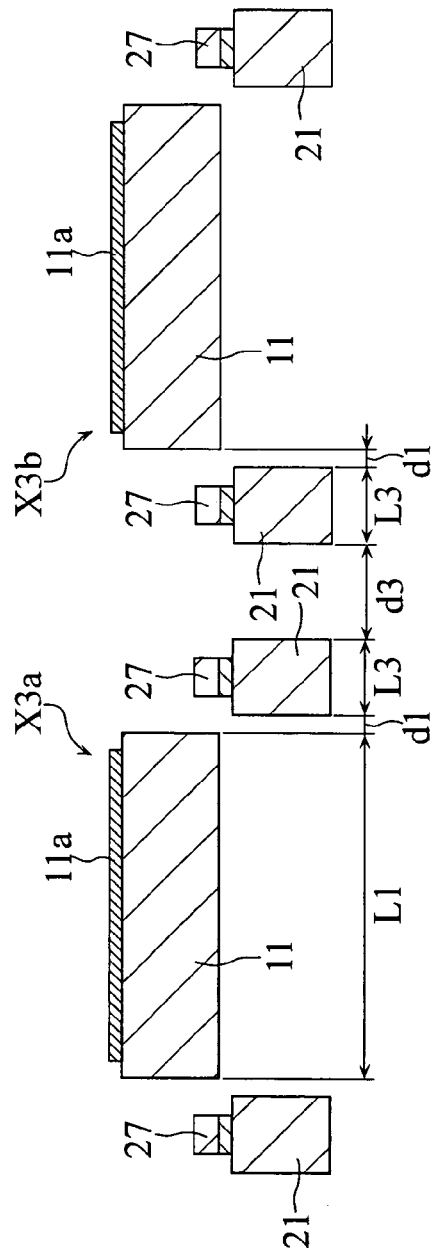
FIG. 38 is a cross-sectional view along the line XXXVIII-XXXVIII in FIG. 37.
Figure 39:
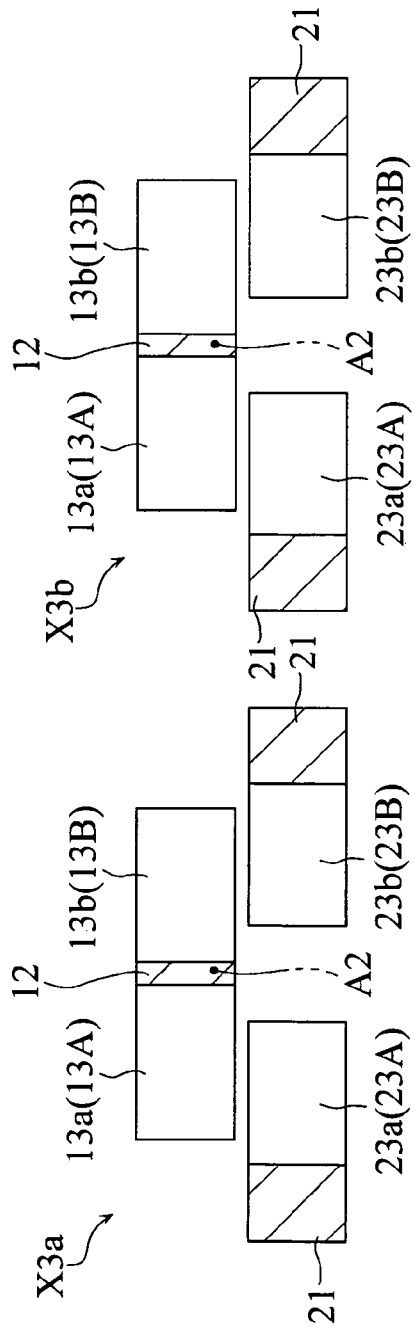
FIG. 39 is a cross-sectional view along the line XXXIX-XXXIX in FIG. 37.
Figure 40:
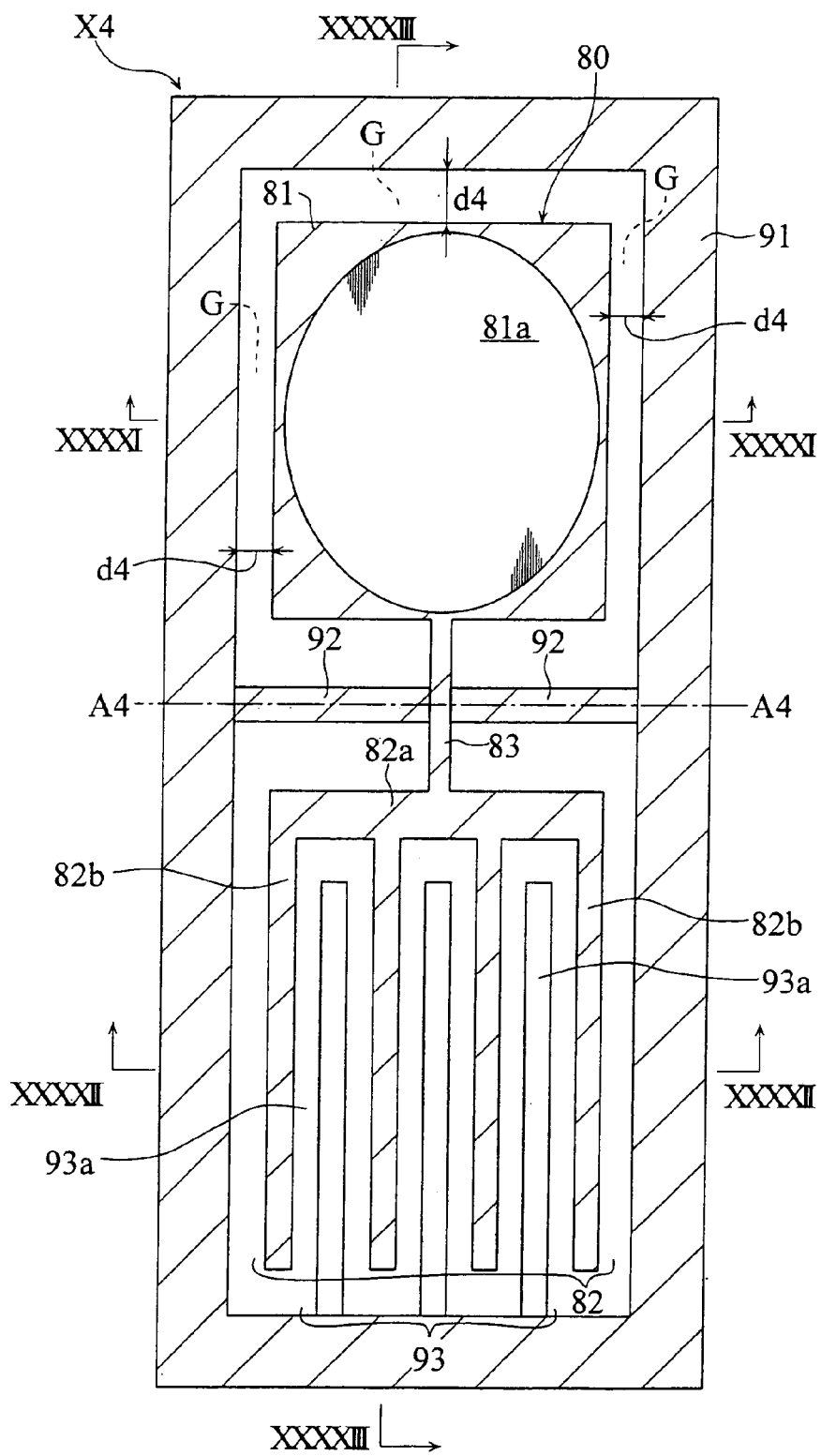
FIG. 40 is a plan view showing an example of a micromirror element as related art.
Figure 41:
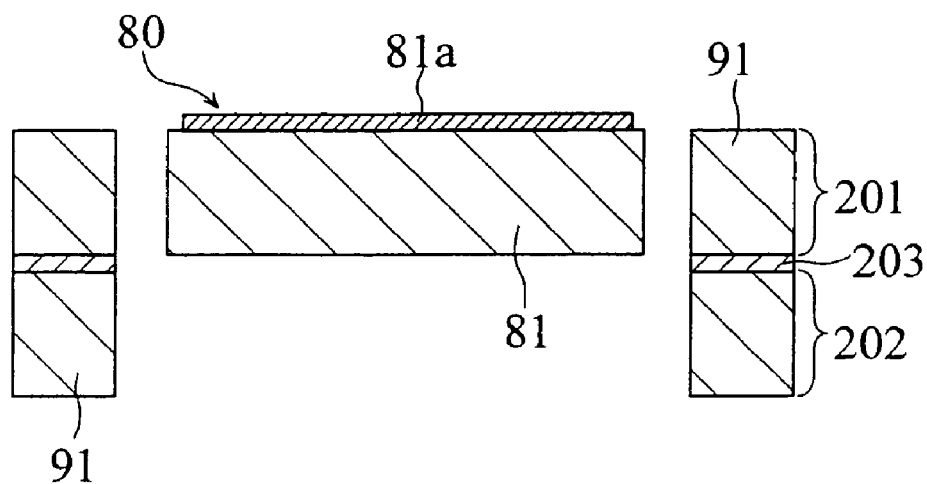
FIG. 41 is a cross-sectional view along the line XXXXI-XXXXI in FIG. 40.
Figure 42:
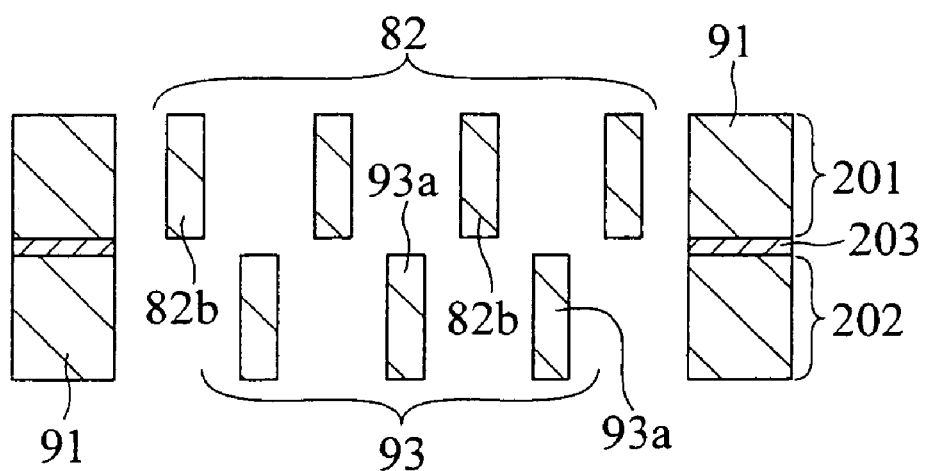
FIG. 42 is a cross-sectional view along the line XXXXII-XXXXII in FIG. 40.
Figure 43:
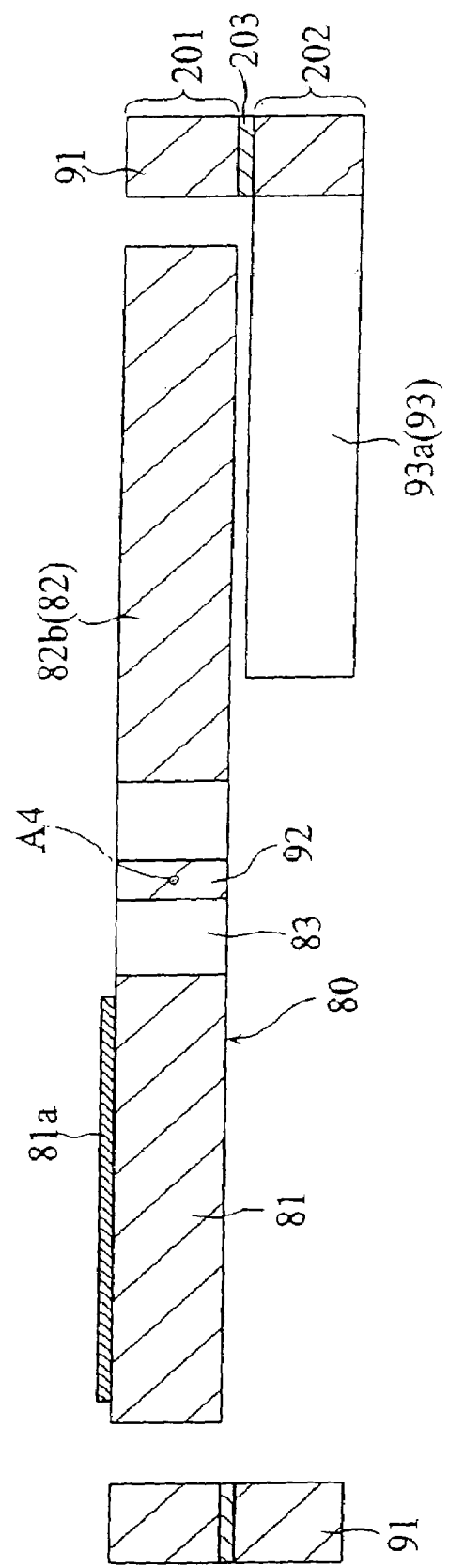
FIG. 43 is a cross-sectional view along the line XXXXIII-XXXXIII in FIG. 40.
Figure 44A:
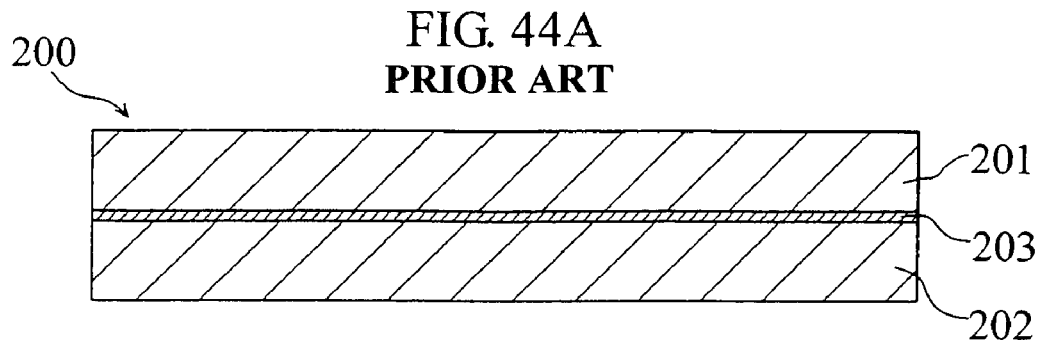
FIGS. 44A-44D illustrate steps of the process for manufacturing the micromirror element shown in FIG. 40.
Figure 44B:
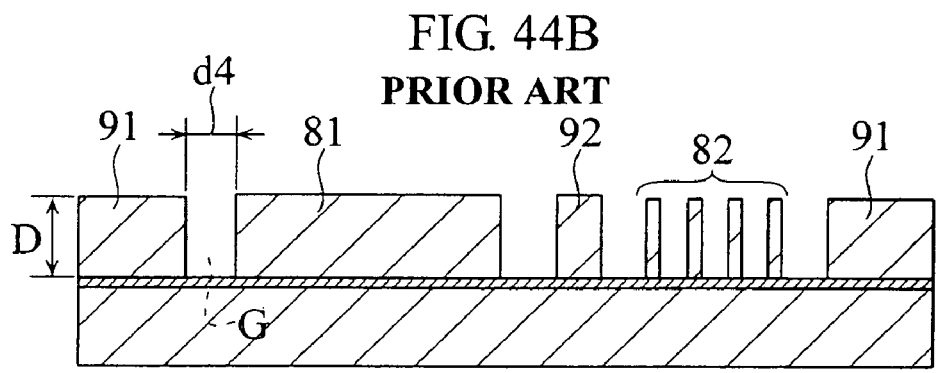
Figure 44C:
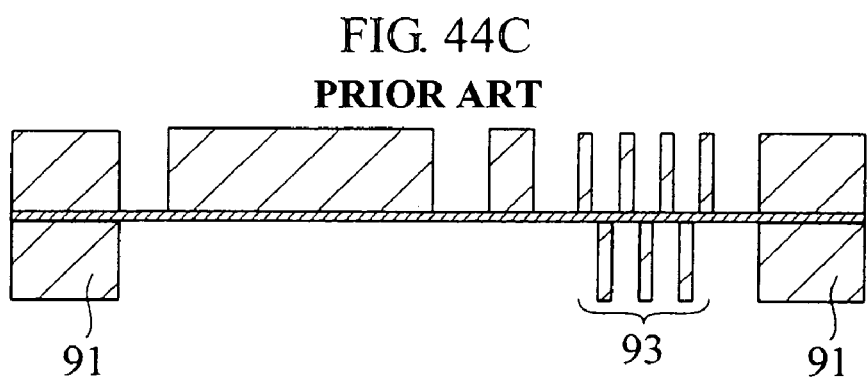
Figure 44D:
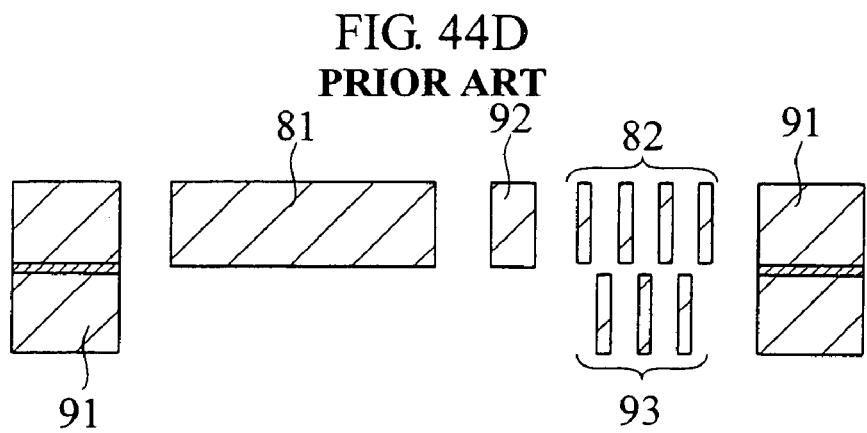

FIG. 37 shows a micromirror array Y3 comprising a plurality of micromirror elements X3. In order to make the figure clearer, in FIG. 37, some of the parts are represented by hatching. Further, FIGS. 38 and 39 are enlarged cross-sectional view along the lines XXXVIII-XXXVIII and XXXIX-XXXIX in FIG. 37, respectively. In the micromirror array Y3, a plurality of micromirror elements X3 are arranged in a row in the direction of the oscillation axis A1. Therefore, in the micromirror array Y3, a plurality of mirror surfaces 11a are arranged in a row in the direction of the oscillation axis A1. The arrangement pitch of a plurality of mirror surfaces 11a is represented by L1+2L3+2d1+d3, where d3 stands for a separation distance between the frames 21 of two adjacent micromirror elements X3.

As described hereinabove, the separation distance d1 of the mirror support section 11 and frame 21 in the in-plane direction of the material substrate may be a minimum length necessary to avoid the contact of the mirror support section 11 with the frame 21 during the oscillating action of the oscillation section 10. In addition, the micromirror element X3 has a drive mechanism (comb-tooth electrodes 13A, 13B, 23A, 23B, 36, 37) of a structure adapted for shortening in the direction of the oscillation axis A1. Therefore, in the micromirror array Y3, a short arrangement pitch can be realized for a plurality of mirror surfaces 11a. Thus, in the micromirror array Y3, a plurality of mirror surfaces 11a can be arranged with a high density in the direction of the oscillation axis A1.

Further, in the micromirror array Y3, the drive of the oscillation section 10 of each micromirror element X3 around the oscillation axis A1 can be conducted by applying the prescribed electric potential to the comb-tooth electrodes 13A, 13B in a state where the comb-tooth electrodes 23A, 23B are connected to the ground. Therefore, in the micromirror array Y3, the electric interference between the adjacent micromirror elements X3 can be inhibited, in the same manner as described hereinabove with reference to the micromirror array Y2. Such a micromirror array Y3 is suitable for arranging a plurality of mirror surfaces 11a with a high density in the direction of the oscillation axis A1.

The invention claimed is:

1. A micro oscillating element formed integrally from a material substrate made up of a first conductive layer, a second conductive layer and an insulating layer disposed between the first conductive layer and the second conductive layer, the oscillating element comprising:
- an oscillation section including a movable functional section;
- an oscillation section supporting frame;
- a torsional joining section for joining the oscillation section and the frame, the joining section defining an oscillation axis for oscillating action of the oscillation section;
- a thin structural section fixed to the frame via the insulating layer;
- wherein the movable functional section is a part formed in the first conductive layer, and the frame is a part formed in the second conductive layer; and
- wherein the structural section is formed in the first conductive layer and is thinner than the first conductive layer.

2. The micro oscillating element according to claim 1, wherein the thin structural section is electrically connected to the frame via a conductive connection section passing through the insulating layer.

3. A micro oscillating element formed integrally from a material substrate made up of a first conductive layer, a second conductive layer and an insulating layer disposed between the first conductive layer and the second conductive layer, the oscillating element comprising:
- an oscillation section including a movable functional section;
- an oscillation section supporting frame;
- a torsional joining section for joining the oscillation section and the frame, the joining section defining an oscillation axis for oscillating action of the oscillation section;
- a narrow structural section formed in the first conductive layer;
- wherein the movable functional section is a part formed in the first conductive layer, and the frame is a part formed in the second conductive layer;
- wherein the narrow structural section is fixed to the frame via the insulating layer and is narrower than the frame.

4. The micro oscillating element according to claim 3, wherein the narrow structural section is electrically connected to the frame via a conductive connection section passing through the insulating layer.

5. The micro oscillating element according to claim 3, wherein the narrow structural section is thinner than the movable functional section.

6. The micro oscillating element according to claim 5, wherein the narrow structural section is electrically connected to the frame via a conductive connection section passing through the insulating layer.

7. A micro oscillating element formed integrally from a material substrate made up of a first conductive layer, a second conductive layer and an insulating layer disposed between the first conductive layer and the second conductive layer, the oscillating element comprising:
- an oscillation section including a movable functional section;
- an oscillation section supporting frame;
- a torsional joining section for joining the oscillation section and the frame, the joining section defining an oscillation axis for oscillating action of the oscillation section;
- wherein the movable functional section is a part formed in the first conductive layer, and the frame is a part formed in the second conductive layer;
- wherein the oscillation section includes an arm section and a first comb-tooth electrode, the arm section extending from the movable functional section in a direction intersecting the oscillation axis, the first comb-tooth electrode including a plurality of first electrode teeth that extend from the arm section in a direction intersecting the arm section and are separated from each other; and
- wherein the frame is provided with a second comb-tooth electrode to cooperate with the first comb-tooth electrode for oscillating the oscillation section, the second comb-tooth electrode including a plurality of second electrode teeth that extend from the frame in a direction intersecting the arm section and are separated from each other.

8. The micro oscillating element according to claim 7, wherein the first electrode teeth extend in parallel to the oscillation axis.

9. The micro oscillating element according to claim 7, wherein the first electrode teeth extend in a direction intersecting the oscillation axis.

10. The micro oscillating element according to claim 7, wherein the second electrode teeth extend in parallel to the first electrode teeth.

11. The micro oscillating element according to claim 7, wherein the first comb-tooth electrode comprises at least three electrode teeth, and a distance between two adjacent first electrode teeth increases with a distance from the oscillation axis.

12. The micro oscillating element according to claim 7, wherein the second comb-tooth electrode comprises at least three electrode teeth, and a distance between two adjacent second electrode teeth increases with a distance from the oscillation axis.

13. The micro oscillating element according to claim 7, wherein a relevant one of the first electrode teeth is positioned between two second electrode teeth that are adjacent in an extension direction of the arm section, the relevant one of the first electrode teeth being offset toward the oscillation axis from a central position between said two second electrode teeth.

14. The micro oscillating element according to claim 7, wherein a relevant one of the first electrode teeth is positioned between two second electrode teeth that are adjacent in an extension direction of the arm section, the relevant one of the first electrode teeth being offset away from the oscillation axis from a central position between said two second electrode teeth.

15. A micro oscillating element formed integrally from a material substrate made up of a first conductive layer, a second conductive layer and an insulating layer disposed between the first conductive layer and the second conductive layer, the oscillating element comprising:
- an oscillation section including a movable functional section;
- an oscillation section supporting frame;
- a torsional joining section for joining the oscillation section and the frame, the joining section defining an oscillation axis for oscillating action of the oscillation section;

an additional frame and an additional torsional joining section;

wherein the movable functional section is a part formed in the first conductive layer, and the frame is a part formed in the second conductive layer; and wherein the additional torsional joining section joins the additional frame and the oscillation section supporting frame and also defines an oscillation axis for oscillating action of the oscillation section supporting frame.

16. A micro oscillating element formed integrally from a material substrate made up of a first conductive layer, a second conductive layer and an insulating layer disposed between the first conductive layer and the second conductive layer, the oscillating element comprising:

an oscillation section including a movable functional section;

an oscillation section supporting frame;

a torsional joining section for joining the oscillation section and the frame, the joining section defining an oscillation axis for oscillating action of the oscillation section;

a thin structural section fixed to the frame;

wherein the movable functional section is a part formed in the first conductive layer, and at least a part of the frame is formed in the second conductive layer; and wherein the thin structural section is formed in the first conductive layer and is thinner than the first conductive layer.

17. The micro oscillating element according to claim 16, wherein the thin structural section is connected to the torsional joining section.

18. The micro oscillating element according to claim 17, wherein the narrow structural section is connected to the torsional joining section.

19. A micro oscillating element formed integrally from a material substrate made up of a first conductive layer, a second conductive layer and an insulating layer disposed between the first conductive layer and the second conductive layer, the oscillating element comprising:

an oscillation section including a movable functional section;

an oscillation section supporting frame;

a torsional joining section for joining the oscillation section and the frame, the joining section defining an oscillation axis for oscillating action of the oscillation section;

a narrow structural section formed in the first conductive layer;

wherein the movable functional section is a part formed in the first conductive layer, and at least a part of the frame is formed in the second conductive layer;

wherein the narrow structural section is fixed to the frame and is narrower than the frame at least partially.

* * * * *